US011962374B2

United States Patent
Raghavan et al.

(10) Patent No.: US 11,962,374 B2
(45) Date of Patent: Apr. 16, 2024

(54) COMMUNICATIONS USING MULTIPLE DISTANCE-DEPENDENT ANALOG BEAMFORMING CODEBOOKS

(71) Applicant: QUALCOMM Incorporated, San Diego, CA (US)

(72) Inventors: Vasanthan Raghavan, West Windsor Township, NJ (US); Tao Luo, San Diego, CA (US); Mohammad Ali Tassoudji, San Diego, CA (US); Junyi Li, Fairless Hills, PA (US)

( * ) Notice: Subject to any disclaimer, the term of this patent is extended or adjusted under 35 U.S.C. 154(b) by 8 days.

(21) Appl. No.: 18/047,835

(22) Filed: Oct. 19, 2022

(65) Prior Publication Data

US 2023/0130505 A1 Apr. 27, 2023

Related U.S. Application Data

(60) Provisional application No. 63/270,992, filed on Oct. 22, 2021.

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC ............ H04W 72/23; H04W 74/0833; H04W 72/0446; H04W 24/10; H04W 72/21; H04W 76/27; H04W 72/0453; H04W 56/001; H04B 7/0695; H04B 7/088; H04B 7/0617; H04B 7/0626; H04B 17/318; H04B 7/0408; H04B 7/0639; H04B 7/063

USPC ......................................................... 375/267
See application file for complete search history.

(56) References Cited

U.S. PATENT DOCUMENTS

| 2020/0314673 | A1  | 10/2020 | Deogun et al. |
| 2020/0412434 | A1* | 12/2020 | Zhu ..................... H04J 11/0069 |
| 2021/0289454 | A1  | 9/2021  | Sun |
| 2021/0289455 | A1  | 9/2021  | Sun |
| 2022/0124672 | A1* | 4/2022  | Xu ........................ H04W 72/23 |

(Continued)

OTHER PUBLICATIONS

International Search Report and Written Opinion—PCT/US2022/078463—ISA/EPO—dated Jan. 30, 2023.

(Continued)

*Primary Examiner* — Eva Y Puente
(74) *Attorney, Agent, or Firm* — Holland & Hart LLP/Qualcomm

(57) ABSTRACT

Methods, systems, and devices for wireless communications are described. A base station may transmit a synchronization signal block (SSB) burst set including a first set of SSBs transmitted using a first codebook and a second set of SSBs transmitted using a second codebook. In some cases, the first codebook may be configured for beamforming at a first transmission distance range (e.g., for far field transmissions) and the second codebook may be configured for beamforming at a second transmission distance range (e.g., for near field transmissions). Based on transmitting the SSB burst, the base station may receive an indication of a first SSB from the first set or the second set from a user equipment (UE). The base station may then communicate messages to the UE using a transmission beam and codebook associated with the first SSB indicated by the UE.

30 Claims, 17 Drawing Sheets

(56) References Cited

U.S. PATENT DOCUMENTS

| | | | |
|---|---|---|---|
| 2023/0179385 A1* | 6/2023 | Wang .................... | H04L 5/0023 370/330 |
| 2023/0217381 A1* | 7/2023 | Niu .................... | H04B 7/04013 370/329 |
| 2023/0389080 A1* | 11/2023 | Christoffersson ..... | H04L 5/0048 |

OTHER PUBLICATIONS

Wang T., et al., "Near-Field Beam Management in LIS-Assisted mmWave Systems", 2021 13th International Conference on Wireless Communications and Signal Processing (WCSP), IEEE, Oct. 20, 2021, pp. 1-6, XP034032753, DOI: 10.1109/WCSP52459.2021. 9613636 [retrieved on Nov. 11, 2021] the whole document.

Wei X., et al., "Codebook Design and Beam Training for Extremely Large-Scale RIS: Far-Field or Near-Field?", arxiv.org, Cornell University Library, 201 Olin Library Cornell University Ithaca, NY 14853, Sep. 21, 2021, 19 Pages, XP091055925, the whole document.

\* cited by examiner

COMMUNICATIONS USING MULTIPLE DISTANCE-DEPENDENT ANALOG BEAMFORMING CODEBOOKS

CROSS REFERENCE

The present Application for Patent claims the benefit of U.S. Provisional Patent Application No. 63/270,992 by RAGHAVAN et al., entitled "COMMUNICATIONS USING MULTIPLE DISTANCE-DEPENDENT ANALOG BEAMFORMING CODEBOOKS," filed Oct. 22, 2021, assigned to the assignee hereof, and expressly incorporated by reference herein.

FIELD OF TECHNOLOGY

The following relates to wireless communications, including communications using multiple distance-dependent analog beamforming codebooks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support communications using multiple distance-dependent analog beamforming codebooks. Generally, the described techniques provide for a base station (such as or including a network entity) to communicate messages to a user equipment (UE) using one of multiple different codebooks each configured for beamforming at a certain transmission distance range. For example, the base station may transmit a control message indicating a synchronization signal block (SSB) burst set. Then, the base station may transmit a first set of SSBs in the SSB burst set using a first codebook configured for beamforming at a first transmission distance range (e.g., configured for beamforming far field transmissions) and transmit a second set of SSBs in the SSB burst set using a second codebook configured for beamforming at a second transmission distance range (e.g., configured for beamforming near field transmissions). A UE receiving the SSB burst set may detect signal qualities associated with each of the received SSBs and identify a first SSB associated with a highest detected signal quality. The UE may then transmit, to the base station, an indication of the first SSB from the first set of SSBs or the second set of SSBs. Based on receiving the indication of the first SSB from the UE, the base station may communicate messages to the UE using a transmit beam and codebook associated with the first SSB.

A method for wireless communication at a network entity is described. The method may include transmitting a control message indicating an SSB burst set, transmitting, using a first codebook configured for beamforming at a first transmission distance range, a first set of SSBs of the SSB burst set via a first set of multiple transmit beams, transmitting, using a second codebook configured for beamforming at a second transmission distance range, a second set of SSBs of the SSB burst set via a second set of multiple transmit beams, and receiving, from a UE and based on transmitting the first set of SSBs and the second set of SSBs, an indication of a first SSB from the first set of SSBs or the second set of SSBs.

An apparatus for wireless communication at a network entity is described. The apparatus may include a processor, memory coupled with the processor, and instructions stored in the memory. The instructions may be executable by the processor to cause the apparatus to transmit a control message indicating an SSB burst set, transmit, using a first codebook configured for beamforming at a first transmission distance range, a first set of SSBs of the SSB burst set via a first set of multiple transmit beams, transmit, using a second codebook configured for beamforming at a second transmission distance range, a second set of SSBs of the SSB burst set via a second set of multiple transmit beams, and receive, from a UE and based on transmitting the first set of SSBs and the second set of SSBs, an indication of a first SSB from the first set of SSBs or the second set of SSBs.

Another apparatus for wireless communication at a network entity is described. The apparatus may include means for transmitting a control message indicating an SSB burst set, means for transmitting, using a first codebook configured for beamforming at a first transmission distance range, a first set of SSBs of the SSB burst set via a first set of multiple transmit beams, means for transmitting, using a second codebook configured for beamforming at a second transmission distance range, a second set of SSBs of the SSB burst set via a second set of multiple transmit beams, and means for receiving, from a UE and based on transmitting the first set of SSBs and the second set of SSBs, an indication of a first SSB from the first set of SSBs or the second set of SSBs.

A non-transitory computer-readable medium storing code for wireless communication at a network entity is described. The code may include instructions executable by a processor to transmit a control message indicating an SSB burst set, transmit, using a first codebook configured for beamforming at a first transmission distance range, a first set of SSBs of the SSB burst set via a first set of multiple transmit beams, transmit, using a second codebook configured for beamforming at a second transmission distance range, a second set of SSBs of the SSB burst set via a second set of multiple transmit beams, and receive, from a UE and based on transmitting the first set of SSBs and the second set of SSBs, an indication of a first SSB from the first set of SSBs or the second set of SSBs.

Some examples of the method, apparatuses, and non-transitory computer-readable medium described herein may further include operations, features, means, or instructions for receiving, from the UE, a refinement request message requesting initiation of a beam refinement procedure and transmitting, to the UE, a reply message declining to initiate the beam refinement procedure based on an estimated distance to the UE that may be associated with the first SSB.

Some examples of the method, apparatuses, and non-transitory computer-readable medium described herein may further include operations, features, means, or instructions for receiving, from the UE, a refinement request message requesting initiation of a beam refinement procedure and performing the beam refinement procedure using at least one of the first codebook, or the second codebook, or both, based on an estimated distance to the UE that may be associated with the first SSB.

In some examples of the method, apparatuses, and non-transitory computer-readable medium described herein, performing the beam refinement procedure may include operations, features, means, or instructions for performing the beam refinement procedure with the UE using the first codebook configured for beamforming at the first transmission distance range based on the first transmission distance range being greater than the second transmission distance range.

In some examples of the method, apparatuses, and non-transitory computer-readable medium described herein, transmitting the control message may include operations, features, means, or instructions for transmitting the control message indicating a first repetition period for transmitting the first set of SSBs and indicating a second repetition period for transmitting the second set of SSBs.

In some examples of the method, apparatuses, and non-transitory computer-readable medium described herein, the first repetition period may be smaller than the second repetition period based on the first transmission distance range being greater than the second transmission distance range.

Some examples of the method, apparatuses, and non-transitory computer-readable medium described herein may further include operations, features, means, or instructions for communicating a message to the UE using a first transmission beam of one of the first set of multiple transmit beams or one of the second set of multiple transmit beams based on the indication.

Some examples of the method, apparatuses, and non-transitory computer-readable medium described herein may further include operations, features, means, or instructions for transmitting, to the UE, a message using a transmission beam of one of the first codebook or the second codebook via a subset of a set of multiple antenna elements of an antenna panel based on an estimated distance to the UE that may be associated with the first SSB.

Some examples of the method, apparatuses, and non-transitory computer-readable medium described herein may further include operations, features, means, or instructions for transmitting the first set of SSBs includes transmitting the first set of SSBs using a first quantity of transmission elements based on using the first codebook configured for beamforming at the first transmission distance range and the first transmission distance range being greater than the second transmission distance range and transmitting the second set of SSBs includes transmitting the second set of SSBs using a second quantity of the transmission elements that may be less than the first quantity of transmission elements based on using the second codebook configured for beamforming at the second transmission distance range and the second transmission distance range being less than the first transmission distance range.

In some examples of the method, apparatuses, and non-transitory computer-readable medium described herein, receiving the indication may include operations, features, means, or instructions for receiving a measurement report including the indication of the first SSB.

In some examples of the method, apparatuses, and non-transitory computer-readable medium described herein, a first quantity of the first set of multiple transmit beams may be greater than a second quantity of the second set of multiple transmit beams based on the first transmission distance range being greater than the second transmission distance range.

In some examples of the method, apparatuses, and non-transitory computer-readable medium described herein, each of the first set of multiple transmit beams may be associated with a first quantity of configurable beamwidths and each of the second set of multiple transmit beams may be associated with a second quantity of configurable beamwidths that may be each wider than the first quantity of configurable beamwidths based on the first transmission distance range being greater than the second transmission distance range.

In some examples of the method, apparatuses, and non-transitory computer-readable medium described herein, the first set of SSBs may be interspersed in a time domain with the second set of SSBs.

A method for wireless communication at a UE is described. The method may include receiving, from a network entity, a control message indicating an SSB burst set, receiving a first set of SSBs of the SSB burst set associated with a first set of multiple transmit beams at the network entity, the first set of SSBs associated with a first codebook configured for beamforming at a first transmission distance range, receiving a second set of SSBs of the SSB burst set associated with a second set of multiple transmit beams at the network entity, the second set of SSBs associated with a second codebook configured for beamforming at a second transmission distance range, and transmitting, to the network entity and based on receiving the first set of SSBs and the second set of SSBs, an indication of a first SSB from the first set of SSBs or the second set of SSBs.

An apparatus for wireless communication at a UE is described. The apparatus may include a processor, memory coupled with the processor, and instructions stored in the memory. The instructions may be executable by the processor to cause the apparatus to receive, from a network entity, a control message indicating an SSB burst set, receive a first set of SSBs of the SSB burst set associated with a first set of multiple transmit beams at the network entity, the first set of SSBs associated with a first codebook configured for beamforming at a first transmission distance range, receive a second set of SSBs of the SSB burst set associated with a second set of multiple transmit beams at the network entity, the second set of SSBs associated with a second codebook configured for beamforming at a second transmission distance range, and transmit, to the network entity and based on receiving the first set of SSBs and the second set of SSBs, an indication of a first SSB from the first set of SSBs or the second set of SSBs.

Another apparatus for wireless communication at a UE is described. The apparatus may include means for receiving, from a network entity, a control message indicating an SSB burst set, means for receiving a first set of SSBs of the SSB burst set associated with a first set of multiple transmit beams at the network entity, the first set of SSBs associated with a first codebook configured for beamforming at a first transmission distance range, means for receiving a second set of SSBs of the SSB burst set associated with a second set of multiple transmit beams at the network entity, the second set of SSBs associated with a second codebook configured for beamforming at a second transmission distance range, and means for transmitting, to the network entity and based on receiving the first set of SSBs and the second set of SSBs, an indication of a first SSB from the first set of SSBs or the second set of SSBs.

A non-transitory computer-readable medium storing code for wireless communication at a UE is described. The code may include instructions executable by a processor to receive, from a network entity, a control message indicating an SSB burst set, receive a first set of SSBs of the SSB burst set associated with a first set of multiple transmit beams at the network entity, the first set of SSBs associated with a first codebook configured for beamforming at a first transmission distance range, receive a second set of SSBs of the SSB burst set associated with a second set of multiple transmit beams at the network entity, the second set of SSBs associated with a second codebook configured for beamforming at a second transmission distance range, and transmit, to the network entity and based on receiving the first set of SSBs and the second set of SSBs, an indication of a first SSB from the first set of SSBs or the second set of SSBs.

Some examples of the method, apparatuses, and non-transitory computer-readable medium described herein may further include operations, features, means, or instructions for transmitting, to the network entity, a refinement request message requesting initiation of a beam refinement procedure and receiving, from the network entity, a reply message declining to initiate the beam refinement procedure based on transmitting the refinement request message.

Some examples of the method, apparatuses, and non-transitory computer-readable medium described herein may further include operations, features, means, or instructions for transmitting, to the network entity, a refinement request message requesting initiation of a beam refinement procedure and performing the beam refinement procedure based on transmitting the refinement request message.

In some examples of the method, apparatuses, and non-transitory computer-readable medium described herein, performing the beam refinement procedure may include operations, features, means, or instructions for performing the beam refinement procedure with the network entity based on the first plurality of transmit beams using the first codebook configured for beamforming at the first transmission distance range and the first transmission distance range being greater than the second transmission distance range.

In some examples of the method, apparatuses, and non-transitory computer-readable medium described herein, receiving the control message may include operations, features, means, or instructions for receiving the control message indicating a first repetition period for receiving the first set of SSBs and indicating a repetition period for receiving the second set of SSBs.

In some examples of the method, apparatuses, and non-transitory computer-readable medium described herein, the first repetition period may be smaller than the second repetition period based on the first transmission distance range being greater than the second transmission distance range.

Some examples of the method, apparatuses, and non-transitory computer-readable medium described herein may further include operations, features, means, or instructions for receiving communications from the network entity transmitted using a first transmission beam of one of the first set of multiple transmit beams or one of the second set of multiple transmit beams based on the indication.

In some examples of the method, apparatuses, and non-transitory computer-readable medium described herein, transmitting the indication may include operations, features, means, or instructions for transmitting a measurement report including the indication of the first SSB.

Some examples of the method, apparatuses, and non-transitory computer-readable medium described herein may further include operations, features, means, or instructions for detecting signal qualities associated with each of the first set of SSBs and the second set of SSBs, where the first SSB may be associated with a higher channel quality than remaining SSBs from the first set of SSBs and the second set of SSBs.

In some examples of the method, apparatuses, and non-transitory computer-readable medium described herein, a first quantity of the first set of multiple transmit beams may be greater than a second quantity of the second set of multiple transmit beams based on the first transmission distance range being greater than the second transmission distance range.

In some examples of the method, apparatuses, and non-transitory computer-readable medium described herein, each of the first set of multiple transmit beams may be associated with a first quantity of configurable beamwidths and each of the second set of multiple transmit beams may be associate with a second quantity of configurable beamwidths that may be each wider than the first quantity of configurable beamwidths based on the first transmission distance range being greater than the second transmission distance range.

In some examples of the method, apparatuses, and non-transitory computer-readable medium described herein, the first set of SSBs may be interspersed in a time domain with the second set of SSBs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
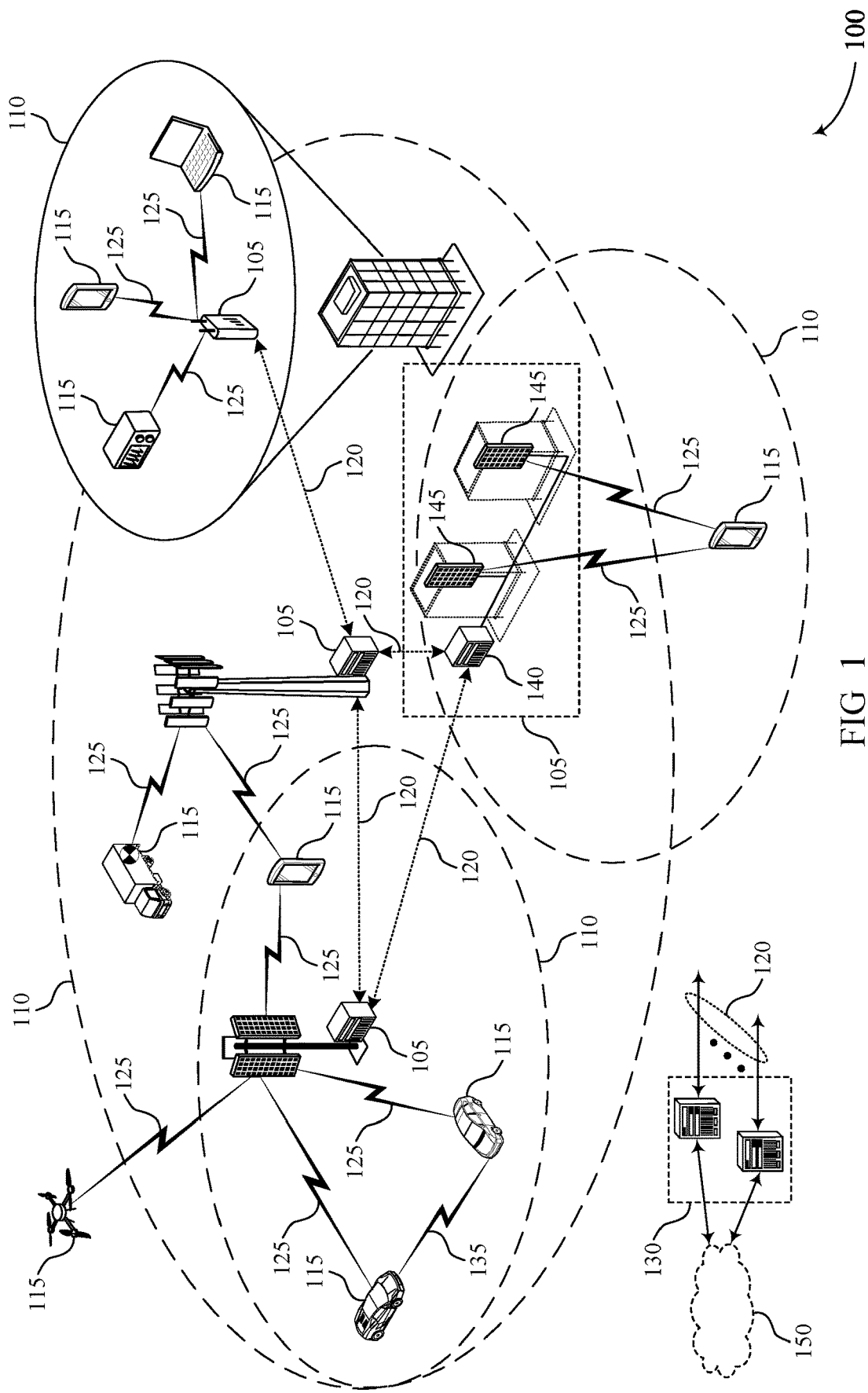
FIG. 1 illustrates an example of a wireless communications system that supports communications using multiple distance-dependent analog beamforming codebooks in accordance with aspects of the present disclosure.

In some wireless communications systems, a base station (such as or including a network entity) may transmit beamformed transmissions using an analog beamforming codebook. That is, the base station may transmit the beamformed transmissions via a set of transmission elements (e.g., an antenna array) according to a weighted vector that is indicated by each entry in the codebook. In some instances, beamformed messages transmitted using a codebook may be associated with higher signal qualities at a certain distance range when compared to other distance ranges. For example, a base station may transmit a beamformed message using a codebook and a first user equipment (UE) that is close to the base station may detect a lower signal quality for the message when compared to a second UE that is farther away from the base station. Here, the codebook used for the beamformed message may be configured for beamforming at a transmission distance range associated with the second UE (e.g., and not configured for beamforming at the transmission distance range associated with the first UE).

To improve a signal quality of beamformed transmissions, a base station may use more than one codebook for beamforming, where each of the codebooks is configured for beamforming at different transmission distance ranges. That is, the base station may transmit some beamformed messages using a codebook configured for relatively large transmission distance ranges (e.g., for far field transmissions) and may transmit other beamformed messages using a second codebook configured for relatively small transmission distance ranges (e.g., for near field transmissions).

In some cases, the base station may transmit a control message indicating a synchronization signal block (SSB) burst set. Then, the base station may transmit a first set of SSBs in the SSB burst set using a first codebook configured for beamforming at a first transmission distance range (e.g., configured for beamforming far field transmissions) and transmit a second set of SSBs in the SSB burst set using a second codebook configured for beamforming at a second transmission distance range (e.g., configured for beamforming near field transmissions). A UE receiving the SSB burst set may detect signal qualities associated with each of the received SSBs and identify a first SSB associated with a highest detected signal quality. The UE may then transmit, to the base station, an indication of the first SSB from the first set of SSBs or the second set of SSBs. Based on receiving the indication of the first SSB from the UE, the base station may communicate messages to the UE using a transmit beam and codebook associated with the first SSB. By using a codebook associated with a highest measured signal quality indicated by the UE, the base station may improve a reliability of beamformed transmissions to the UE.

Aspects of the disclosure are initially described in the context of wireless communications systems. Then, aspects of the disclosure are described in the context of an SSB transmission scheme, beam configurations, and a process flow. Aspects of the disclosure are further illustrated by and described with reference to apparatus diagrams, system diagrams, and flowcharts that relate to communications using multiple distance-dependent analog beamforming codebooks.

FIG. 1 illustrates an example of a wireless communications system 100 that supports communications using multiple distance-dependent analog beamforming codebooks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. In some cases, devices communicating using frequency range 2 (e.g., between 24.25 GHz to 52.6 GHz) or millimeter wave communications may rely on beamforming for communications. Beamforming may be achieved by combining the signals communicated via antenna elements (e.g., transmission elements) of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the adjustments of signals communicated via the antenna elements may be indicated by a codebook. For example, an analog beamforming codebook may configure a transmitting device to apply certain amplitude offsets, phase offsets, beamforming weights, and other adjustments to beamformed transmissions. Thus, a base station 105 transmitting a beamformed transmission to another device (e.g., a UE 115) may transmit the beamformed transmission using the codebook. In some instances, beamformed messages transmitted using a codebook may be associated with higher signal qualities at a certain distance range when compared to other distance ranges. For example, an analog beamforming codebook may be designed (e.g., configured) for far field transmissions, where any transmission that exceeds a threshold distance F is associated with a far field transmission. An example definition of the threshold distance F is shown below in Equation 1.

$$F = \frac{2D^2}{\lambda} \quad (1)$$

In the example of Equation 1, the threshold distance d may be based on a largest dimension of the antenna array D at the transmitting device and the wavelength A of the transmissions. In some cases, D may be based on the inter-antenna element (e.g., transmission element) spacing d and the number inter-antenna elements in the antenna array N, as defined according to Equation 2, shown below.

$$D = Nd \quad (2)$$

In cases that a transmitting device (e.g., a base station 105) includes a large array and transmits messages using a high carrier frequency, the threshold distance F may be relatively large (e.g., when compared to a transmitting device with a smaller array or a transmitting device that transmits messages using a lower carrier frequency). For example, for a transmitting device with an aperture of 1 meter, the threshold distance F for far field transmissions may be 200 meters for 30 GHz transmissions and 800 meters for 120 GHz transmissions. Additionally, the threshold distance F for far field transmissions for a transmitting device with 64 inter-antenna elements that are 1 meter apart and that transmits at 30 GHz may be 20.48 meters. Further, the threshold distance F for a transmitting device with 1024 inter-antenna elements that are 1 meter apart and that transmits at 30 GHz may be 5.2 kilometers.

Here, if a base station 105 transmits, to a receiving device that is closer to the base station 105 than the threshold distance F, a beamformed message using the codebook designed for far field transmissions, the signal quality of the beamformed message may be decreased (e.g., when compared to a beamformed message transmitted to a receiving device that is greater than the threshold distance F away from the base station 105). That is, an electric field associated with beamformed transmission may become distorted for near field transmissions when compared to far field transmissions.

For example, the electric field may scale according $$\frac{1}{r^2} \text{ or } \frac{1}{r^3},$$

where the distance r may correspond to the distance between a transmitting device and a receiving device. For example, r may correspond to a distance between the receiving device from the center of a transmitting array (e.g., antenna array, array of transmission elements) at the transmitting device. As a result of these changes (e.g., in the electric field) as the distance changes, adjusting the codebook for various transmission distance ranges (such as near field transmissions) may result in an increased signal quality for each various transmission distance range.

To improve a signal quality of beamformed transmissions, a base station 105 may use more than one codebook for beamforming, where each of the codebooks are configured for beamforming at different transmission distance ranges. That is, the base station 105 may transmit some beamformed messages using a codebook configured for relatively large transmission distance ranges (e.g., for far field transmissions) and may transmit other beamformed messages using a second codebook configured for relatively small transmission distance ranges (e.g., for near field transmissions).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, SSBs, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

In some cases, the base station 105 may transmit a control message indicating an SSB burst set. Then, the base station 105 may transmit a first set of SSBs in the SSB burst set using a first codebook configured for beamforming at a first transmission distance range (e.g., configured for beamforming far field transmissions) and transmit a second set of SSBs in the SSB burst set using a second codebook configured for beamforming at a second transmission distance range (e.g., configured for beamforming near field transmissions). A UE 115 receiving the SSB burst set may detect signal qualities associated with each of the received SSBs and identify a first SSB associated with a highest detected signal quality. The UE 115 may then transmit, to the base station 105, an indication of the first SSB from the first set of SSBs or the second set of SSBs. Based on receiving the indication of the first SSB from the UE 115, the base station may communicate messages to the UE 115 using a transmit beam and codebook associated with the first SSB. By using a codebook associated with a highest measured signal quality indicated by the UE 115, the base station 105 may improve a reliability of beamformed transmissions to the UE 115.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest detected signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a higher signal strength than other receive configuration directions, higher signal-to-noise ratio (SNR) than other receive configuration directions, or otherwise acceptable signal quality based on listening according to multiple beam directions).

Figure 2:
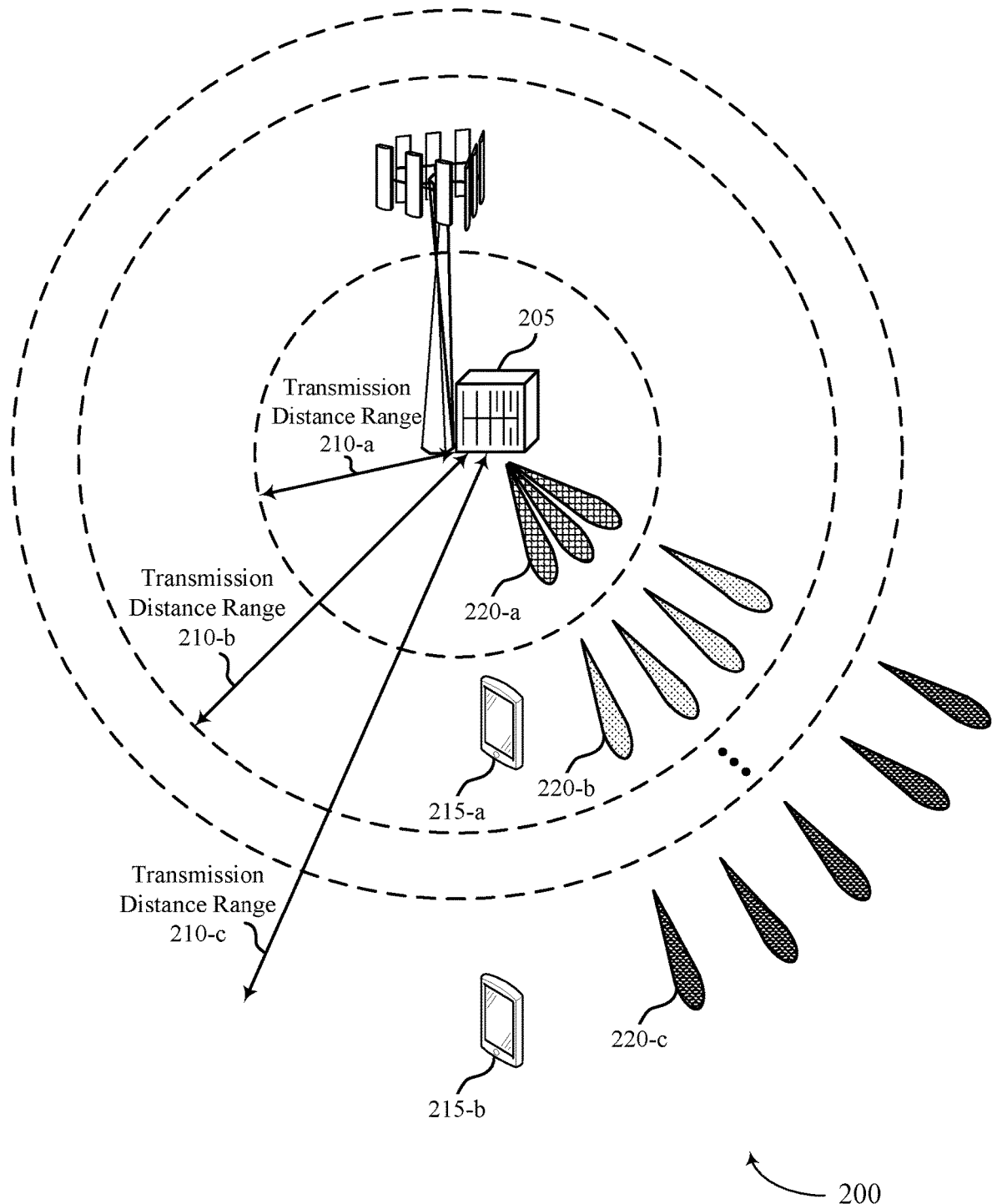
FIG. 2 illustrates an example of a wireless communications system that supports communications using multiple distance-dependent analog beamforming codebooks in accordance with aspects of the present disclosure.

FIG. 2 illustrates an example of a wireless communications system 200 that supports communications using multiple distance-dependent analog beamforming codebooks in accordance with aspects of the present disclosure. In some examples, the wireless communications system 200 may implement aspects of wireless communications system 100. For example, the wireless communications system 200 may include base station 205 and UE 215, which may be examples of a base station 105 and a UE 115, respectively, as described with reference to FIG. 1.

The base station 205 may be configured for beamforming using more than one codebook 225. Additionally, each codebook 225 may be associated with a specific transmission distance range. That is, each of the transmission distance ranges 210 may correspond to distance boundaries for different codebooks 225. For example, the base station 205 may transmit via beams 220-a using the codebook 225-a that is configured for beamforming transmissions within the transmission distance range 210-a (e.g., for near field transmissions). Additionally, the base station 205 may transmit via beams 220-b using the codebook 225-b that is configured for beamforming transmissions between the transmission distance range 210-a and the transmission distance range 210-b (e.g., for intermediate field transmissions). Further, the base station 205 may transmit via beams 220-c using the codebook 225-c that is configured for beamforming transmissions associated with the transmission distance range 210-c (e.g., for far field transmissions).

The base station 205 may use a certain quantity N transmit beams 220 for transmissions using that codebook 225 (e.g., a predefined quantity N, a preconfigured quantity N). For example, the base station 205 may use a quantity $N_1$ transmit beams 220-a for beamforming using the codebook 225-a (e.g., three beams 220-a), a quantity $N_2$ beams 220-b for beamforming using the codebook 225-b (e.g., four beams 220-b), and a quantity $N_K$ beams 220-c for beamforming using the codebook 225-c (e.g., five beams 220-c). In some cases, the quantity N of transmit beams 220 used by the base station 205 for transmissions using a codebook 225 increases as the transmission distance range associated with the codebook 225 increases. That is, the quantity $N_K$ of beams 220-c for beamforming using the codebook 225-c may be greater than the quantity $N_1$ of beams 220-a for beamforming using the codebook 225-a as the transmission distance range 210-c associated with codebook 225-c is greater than the transmission distance range 210-a associated with the codebook 225-a.

The base station 205 may adjust additional transmission parameters (e.g., in addition to those indicated by each codebook 225) for the transmit beams 220 based on the codebook 225 used for transmissions via those transmit beams 220. For example, the base station 205 may adjust a selection of transmission elements (e.g., antenna dimensions, antennas of an antenna array) for transmissions via beams 220 based on the codebook 225 used for transmissions via those transmit beams 220. Here, the base station 205 may select an increasing quantity of the total number of transmission elements at the base station 205 as the transmission distance range 210 associated with the codebook 225 increases. That is, the base station 205 may transmit via beams 220-a using less transmission elements than for transmissions via beams 220-b. Additionally, the base station 205 may transmit via beams 220-b using less transmission elements than for transmissions via beams 220-c. In some cases, the base station 205 may include a 2D or planar array (e.g., so that beamforming in elevation enables the base station 205 to serve UEs 215 at different distances using the height of the base station 205 relative to the UEs 215). Moreover, the techniques described herein, the near field and far field distances may be quite large and may depend on an array size.

In one case, the base station 205 may select a subset of the transmission elements (e.g., less than the total quantity of transmission elements at the base station 205) for transmissions via the transmit beams 220-a based on the codebook 225-a being configured for beamforming at a near field transmission distance range 210-a. For example, in cases that the base station 205 includes 16 transmission elements, the base station 205 may use five of them to transmit messages via the beams 220-a. In some cases, selecting the subset of antenna dimensions to serve UEs 215 within the transmission distance range 210-a may result in less path loss. Additionally, the base station 205 may select more transmission elements for larger transmission distance ranges 210 (e.g., transmission distance ranges 210-b and 210-c) when compared to the quantity of transmission elements selected for the smallest transmission distance range 210-a. For example, the base station 205 may select all of the transmission elements or antenna dimensions for transmission via the transmit beams 220-c based on the codebook 225-c being configured for beamforming at the far field transmission distance range 210-c. In one instance where the base station 205 includes 16 transmission elements, the base station 205 may use each of the 16 transmission elements to transmit messages via the beams 220-c.

In the example of wireless communications system 200, three different transmission distance ranges 210 are illustrated, however there may be more than three transmission distance ranges 210 each associated with a unique codebook 225 configured for beamforming at the corresponding transmission distance range 210 (e.g., four, five, more than five transmission distance ranges 210). For example, the base station 206 may have a hierarchical codebook structure. Here, the base station 205 may use K different codebooks. For example, the base station 205 may rely on a codebook 225 (e.g., Codebook$_i$) using $N_i$ beams 220 when a receiving device (e.g., a UE 215) is a distance d away from the base station 205 corresponding to $d_{i-1} < d < d_i$ where $d_0 = 0$.

In another example, instead of the illustrated three codebooks 225, the base station 205 instead may use two codebooks 225. That is, the base station 205 may have a binary codebook structure. For example, the base station 205 may transmit via beams 220 using a first codebook 225 for near field transmissions (e.g., for transmissions transmitted less than a threshold transmission distance range 210) and may transmit via beams 220 using a second codebook 225 for far field transmissions (e.g., for transmissions transmitted greater than the threshold transmission distance range 210).

The base station 205 may transmit an SSB burst set to one or more UEs 215 within the wireless communications system 200. In the case that the base station 205 is configured for beamforming using more than one codebook, the SSB burst set may include SSBs transmitted using the more than one codebook. For example, the base station 205 may transmit a first set of SSBs in the SSB burst set via the beams 220-a using the codebook 225-a. Additionally, the base station 205 may transmit a second set of SSBs in the SSB burst set via the beams 220-b using the codebook 225-b and a third set of SSBs in the SSB burst set via the beams 220-c using the codebook 225-c. The base station 205 may transmit the SSBs in each set via a quantity of transmit beams 220 that is associated with the codebook 225. For example, the base station 205 may transmit the first set of SSBs using the quantity $N_1$ transmit beams 220-*a* for beamforming using the codebook 225-*a*.

A UE 215 may receive the SSB burst set and detect a signal quality associated with each received SSB in the SSB burst set. Then, the UE 215 may transmit an indication of a first SSB in the SSB burst set associated with a highest detected signal quality. For example, the UE 215-*a* may receive the SSB burst set (e.g., including SSB s received via the transmit beams 220-*a*, 220-*b*, and 220-*c*) and may indicate an SSB associated with a highest measured signal quality. In some cases, the UE 215-*a* may detect that an SSB received via a transmit beam 220-*b* may have a higher signal quality than SSBs received via other transmit beams 220. That is, the base station 205 may transmit an SSB via the transmit beams 220-*b* using the codebook 225-*b* that is configured for beamforming at the transmission distance range 210-*b* of the UE 215-*a* (e.g., the UE 215-*a* is a distance away from the base station 205 within the transmission distance range 210-*b*). In another example, the UE 215-*b* may receive the SSB burst set (e.g., including SSBs received via the transmit beams 220-*a*, 220-*b*, and 220-*c*) and may indicate an SSB associated with a highest measured signal quality. In some cases, the UE 215-*b* may detect that an SSB received via a transmit beam 220-*c* may have a higher signal quality than SSBs received via other transmit beams 220. That is, the base station 205 may transmit an SSB via the transmit beams 220-*c* using the codebook 225-*c* that is configured for beamforming at the transmission distance range 210-*c* of the UE 215-*b* (e.g., the UE 215-*b* is a distance away from the base station 205 within the transmission distance range 210-*c*).

After the base station 205 receives an indication from a UE 215 of an SSB, the base station 205 may transmit messages to that UE 215 using the beam 220 and the codebook 225 associated with the indicated SSB. For example, if the UE 215-*b* indicated an SSB received via a transmit beam 220-*c* (e.g., transmitted by the base station 205 using the codebook 225-*c*), the base station 205 may subsequently beamform messages to the UE 215-*b* using the transmit beam 220-*c* and the codebook 225-*c*.

In some cases, after indicating an SSB to the base station 205, a UE 215 may transmit a refinement request message to the base station 205. For example, the UE 215 may request to perform a beam refinement procedure (e.g., a P-2 procedure as defined in technical specifications or other standards documents) with the base station 205. The base station may determine whether to accept the request for the beam refinement procedure or deny the request based on the beam 220 associated with the indicated SSB. For example, if the beam 220 associated with the indicated SSB is a beam 220-*c* transmitted using a codebook 225-*c* configured for beamforming at a far field transmission distance range 210-*c*, the base station 205 may determine to perform the beam refinement procedure. In some cases, further refining the beam 220-*c* may improve communication reliability between the base station 205 and a UE when communicating via a beam 220-*c* that is transmitted using a codebook 225-*c* configured for beamforming at a far field transmission distance range 210-*c*. In another example, if the beam 220 associated with the indicated SSB is a beam 220-*a* transmitted using a codebook 225-*a* configured for beamforming at a near field transmission distance range 210-*a*, the base station 205 may deny performing the beam refinement procedure. In some cases, further refining the beam 220-*a* may not significantly improve communication reliability between the base station 205 and a UE when communicating via a beam 220-*a* that is transmitted using a codebook 225-*a* configured for beamforming at a near field transmission distance range 210-*a*.

Figure 3:
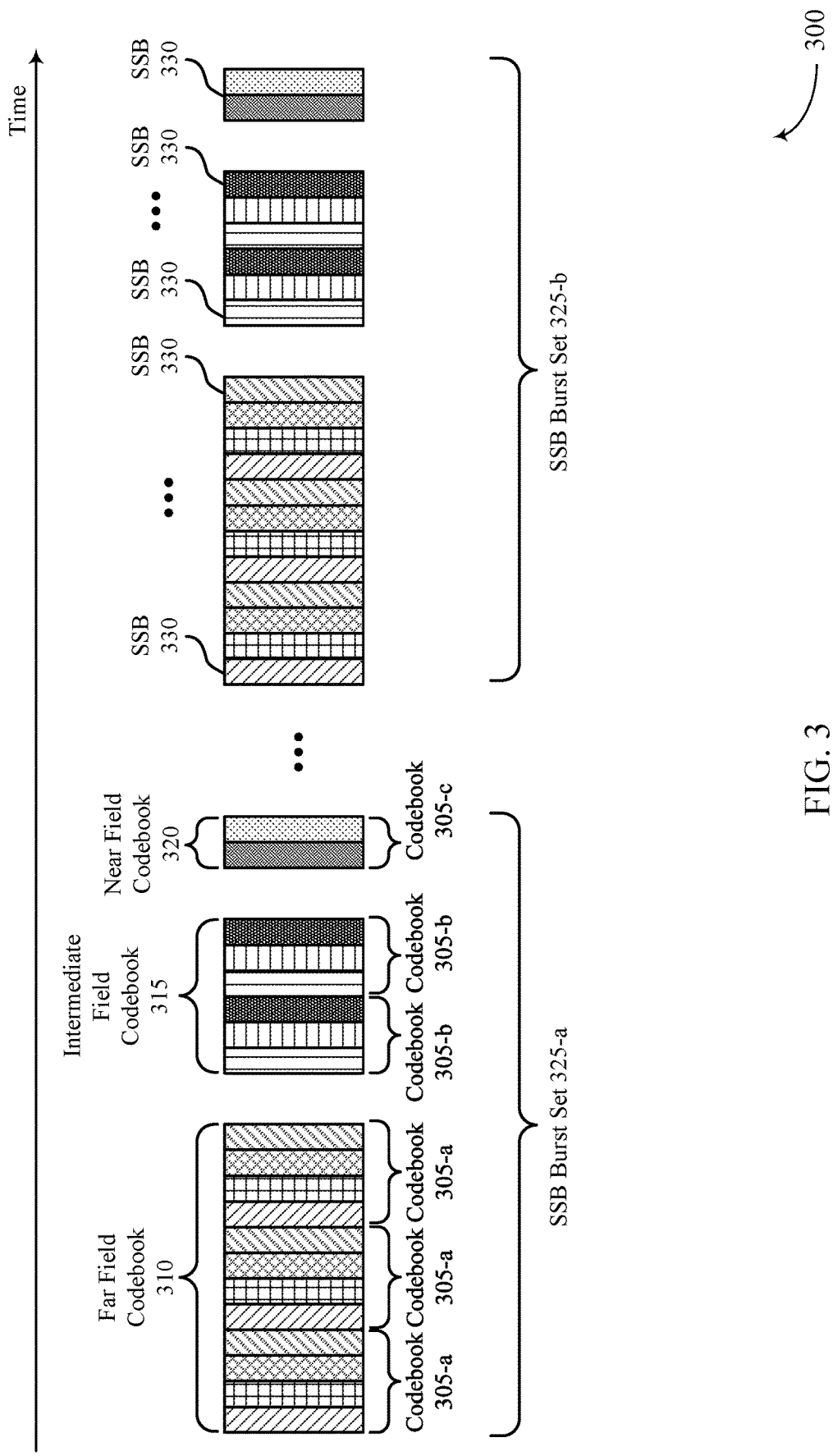
FIG. 3 illustrates an example of a synchronization signal block (SSB) transmission scheme that supports communications using multiple distance-dependent analog beamforming codebooks in accordance with aspects of the present disclosure.

FIG. 3 illustrates an example of an SSB transmission scheme 300 that supports communications using multiple distance-dependent analog beamforming codebooks in accordance with aspects of the present disclosure. In some examples, the base stations 105 and 205, as described with reference to FIGS. 1 and 2, may transmit SSBs according to the SSB transmission scheme 300. That is, the base station may utilize the SSB transmission scheme 300 to transmit an SSB burst set 325 including SSBs 330 transmitted using more than one codebook 305.

The SSB transmission scheme 300 may include multiple SSB burst sets 325. Additionally, each SSB burst set 325 may include multiple sets of SSBs 330 transmitted using a far field codebook 310, an intermediate field codebook 315, or a near field codebook 320. The far field codebook 310 may be an example of the codebook 225-*c* as described in FIG. 2. Additionally, the far field codebook 310 may be a codebook that is configured for beamforming at a far field transmission distance range. The intermediate field codebook 315 may be an example of the codebook 225-*b* as described in FIG. 2 and may additionally or alternatively be configured for beamforming at an intermediate transmission distance range (e.g., closer than a far field transmission range and farther than a near field transmission range). Additionally, the near field codebook 320 may be an example of the codebook 225-*a* as described with reference to FIG. 2 and may additionally or alternatively be configured for beamforming at a near field transmission distance range.

The far field codebook 310 may include multiple repetitions of the codebook 305-*a*. Additionally, the intermediate field codebook 315 may include multiple repetitions of the codebook 305-*b*. Further, the near field codebook 320 may include a single repetition of the codebook 305-*c*. In some examples, the repetitions of the codebooks 305-*a* for the far field codebook 310 may be interspersed with beams for the repetitions of the other codebooks 305-*b* and 305-*c* for closer distance targeting codebooks (e.g., intermediate field codebook 315 and near field codebook 320). In some cases, a transmitting device (e.g., a base station) may transmit SSBs 330 at a higher frequency of repetition for far field users and may additionally transmit SSBs 330 at a lower frequency of repetition for near field users. For example, the base station may transmit three repetitions of the set of SSBs 330 transmitted using the codebook 305-*a* for the far field codebook 310 (e.g., for SSB 330 transmissions transmitted using the far field codebook 310). Additionally, the base station may transmit a single repetition of the set of SSBs 330 transmitted using codebook 305-*c* for the near field codebook 320 (e.g., for SSB 330 transmissions transmitted using the near field codebook 320). In some instances, the number of repetitions of each codebook 305 may be based on the transmission distance range associated with that codebook. That is, the base station may transmit more repetitions of the codebook 305-*a* than the codebook 305-*c* based on the transmission distance range associated with the codebook 305-*a* being greater (e.g., a far field transmission distance range) than the transmission distance range associated with the codebook 305-*c* (e.g., a near field transmission distance range).

Prior to transmitting the SSB burst sets 325-*a* and 325-*b*, the transmitting device (e.g., the base station) may transmit control signaling indicating a configuration for the SSB burst sets 325. For example, the control signaling may indicate each of the SSBs 330 within the SSB burst set 325 (e.g., including the first set of SSBs 330 transmitted using the far field codebook 310, the second set of SSBs 330 transmitted using the intermediate field codebook 315, and the third set of SSBs 330 transmitted using the near field codebook 320). Further, the control signaling may indicate that the number of repetitions of the SSBs 330 transmitted using the codebook 305-a may be greater than the number of the SSBs 330 transmitted using the codebook 305-b, which may in turn be greater than the number of the SSBs 330 transmitted using the codebook 305-c.

Figure 4A:
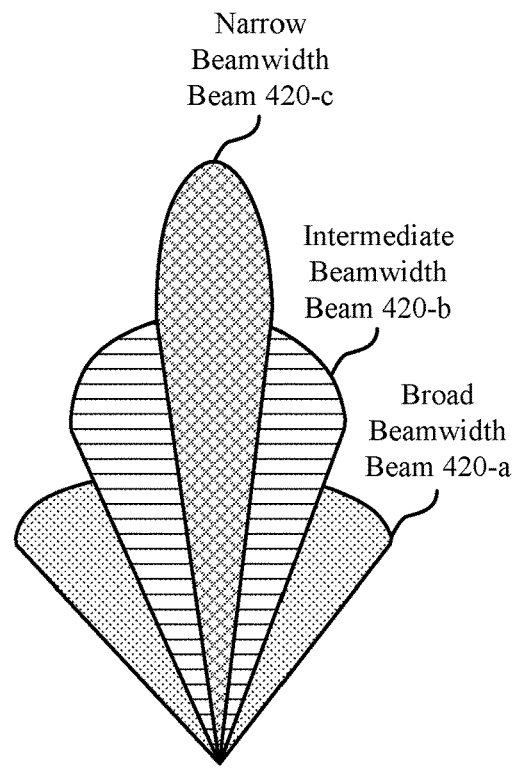
FIGS. 4A and 4B illustrate example beam configurations that support communications using multiple distance-dependent analog beamforming codebooks in accordance with aspects of the present disclosure.
Figure 4B:
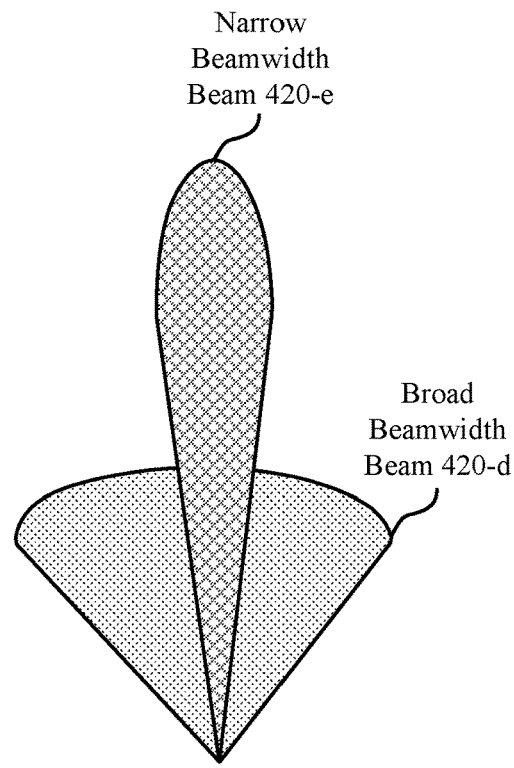

FIGS. 4A and 4B illustrate examples of beam configurations 400 that support communications using multiple distance-dependent analog beamforming codebooks in accordance with aspects of the present disclosure. In some examples, the base stations 105 and 205, as described with reference to FIGS. 1 and 2, may use beam configurations 400 for transmissions using various codebooks. For example, a base station may use beam configuration 400-a when transmitting using a codebook configured for beamforming at a far field transmission distance range. Additionally, a base station may use beam configuration 400-b when transmitting using a codebook configured for beamforming at a near field transmission distance range. In some cases, beams 420 used in far field transmission may trade off beamwidth with array gain (e.g., multiple levels of beam hierarchy), while beams 420 used in near field may have fewer levels of beam hierarchy (e.g., fewer unique beamwidths in the beam configuration 400). That is, the beam configuration 400-a associated with far field transmissions may include more beamwidth configurations when compared to the beam configuration 400-b that is associated with near field transmissions. In some examples, far field beams may have a higher granularity in terms of beamwidth-array gain tradeoff as compared to near field beams.

FIG. 4A illustrates an example beam configuration 400-a including beams 420 with various beamwidths. For example, the beam configuration 400-a may include broad beamwidth beam 420-a, an intermediate beamwidth beam 420-b, and a narrow beamwidth beam 420-c. In some instances, a base station may rely on a wider beamwidth (e.g., the broad beamwidth beam 420-a) for SSB transmissions. In cases that a UE indicates an SSB transmitted according to the beam configuration 400-a (e.g., associated with multiple levels of beamwidths or beam hierarchy), the base station may perform a beam refinement procedure (e.g., a P-2 procedure) with the UE. That is, a beam refinement procedure may be performed by UEs that are receiving far field transmission from the base station. Thus, the base station may accept a request from the UE for a beam refinement procedure based on the UE indicating an SSB associated with a codebook configured for far field transmissions.

FIG. 4B illustrates an example beam configuration 400-b including beams 420 with various beamwidths. For example, the beam configuration 400-b may include broad beamwidth beam 420-d and a narrow beamwidth beam 420-e. In some instances, a base station may rely on a wider beamwidth (e.g., the broad beamwidth beam 420-d) for SSB transmissions. In cases that a UE indicates an SSB transmitted according to the beam configuration 400-b (e.g., associated with fewer levels of beamwidths or beam hierarchy), the base station may decline a beam refinement procedure (e.g., a P-2 procedure) with the UE. That is, a beam refinement procedure may not be performed by UEs that are receiving near field transmissions from the base station (e.g., the broad beamwidth beam 420-d may be sufficient for UEs receiving near field transmissions from the base station). Thus, the base station may not perform beam refinement procedures with a UE based on the UE indicating an SSB associated with a codebook configured for near field transmissions. As such, the base station may either use or decline a P-2 procedure based on a distance to the UE.

Figure 5:
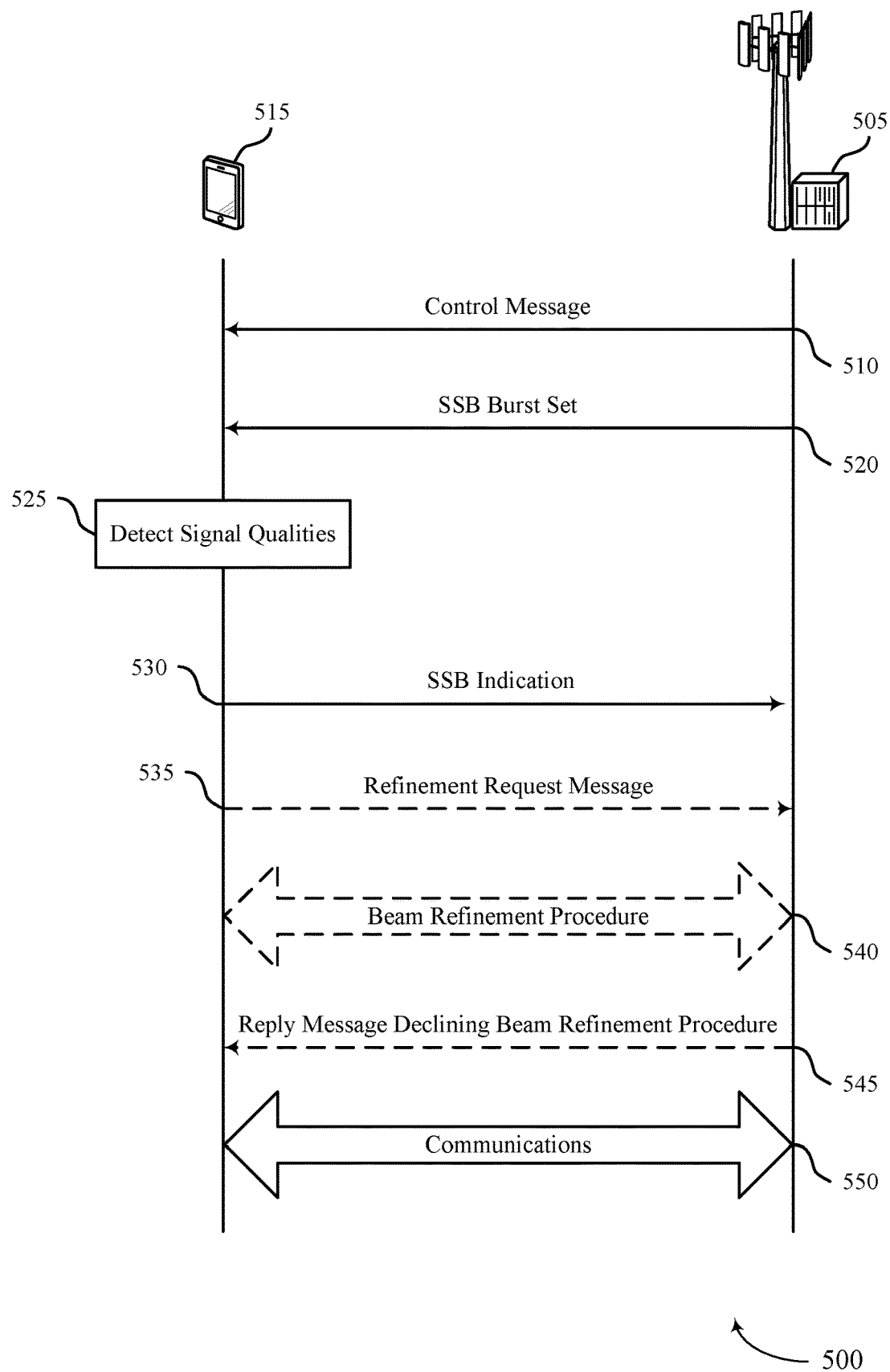
FIG. 5 illustrates an example of a process flow that supports communications using multiple distance-dependent analog beamforming codebooks in accordance with aspects of the present disclosure.

FIG. 5 illustrates an example of a process flow 500 that supports communications using multiple distance-dependent analog beamforming codebooks in accordance with aspects of the present disclosure. In some examples, the process flow 500 may implement aspects of FIGS. 1 through 4. For example, the process flow 500 may include base station 505 and UE 515, which may be examples of a base station and a UE as described with reference to FIGS. 1 through 4.

At 510, the base station 505 may transmit a control message to the UE 515. The control message may indicate an SSB burst set to be transmitted to the UE 515. In some cases, the SSB burst set may include a first set of SSBs transmitted by the base station 505 using a first codebook configured for beamforming at a first transmission distance range (e.g., far field transmissions) and a second set of SSBs transmitted by the base station 505 using a second codebook configured for beamforming at a second transmission distance range (e.g., near field transmissions). In some cases, the control message may indicate additional sets of SSBs transmitted using additional codebooks. For example, the control message may indicate a third set of SSBs transmitted by the base station 505 using a third codebook configured for beamforming at a third transmission distance range (e.g., intermediate transmissions). In some cases, the SSB burst set may include beams sent in accordance with a beam pattern. The techniques described herein may also be applied to burst sets of CSI-RS beams.

In some instances, the control message may indicate a first number of repetitions in the first set of SSBs and a second number of repetitions in the second set of SSBs (e.g., that is less than the first number). For example, the base station 505 may transmit more repetitions in the first set of SSBs based on the first set of SSBs being transmitted using a codebook configured for far field transmissions and may transmit less repetitions in the second set of SSBs based on the second set of SSBs being transmitted using a codebook configured for near field transmissions.

At 520, the base station 505 may transmit an SSB burst set to the UE 515. For example, the base station 505 may transmit, via a first set of transmit beams, the first set of SSBs in the SSB burst set using the first codebook and may transmit, via a second set of transmit beams, the second set of SSBs in the SSB burst set using the second codebook. In cases where the SSB burst set includes additional sets of SSBs, the base station 505 may transmit the additional sets of SSBs using the corresponding additional codebooks.

At 525, the UE 515 may detect signal qualities associated with each SSB in the SSB burst set.

At 530, the UE 515 may transmit, to the base station 505, an indication of a first SSB in the SSB burst set (e.g., from the first set of SSBs or the second set of SSBs). In some cases, the UE 515 may indicate the first SSB based on the first SSB having a higher detected channel quality than each of the remaining SSBs in the SSB burst.

At 535, the UE 515 may optionally transmit a refinement request message to the base station 505. If the UE 515 transmits the refinement request message to the base station 505 at 535, the base station 505 may determine whether to initiate a beam refinement procedure with the UE 515 in response to the refinement request message received at 535. In some cases, the base station 505 may determine whether to initiate the beam refinement procedure based on a transmission distance range associated with the codebook of the first SSB (e.g., indicated by the UE 515 at 530). That is, in cases that the UE 515 indicates an SSB transmitted using a codebook configured for beamforming at a far field transmission distance range, the base station 505 may determine to initiate the beam refinement procedure. Additionally, in cases that the UE 515 indicates an SSB transmitted using a codebook configured for beamforming at a near field transmission distance range, the base station 505 may determine to decline the beam refinement procedure.

In a case that the base station 505 determines to initiate the beam refinement procedure in response to the refinement request message, the base station 505 may proceed to 540. In a case that the base station 505 determines to decline to initiate the beam refinement procedure in response to the refinement request message, the base station 505 may proceed to 545.

At 540, the base station 505 may perform the beam refinement procedure with the UE 515. For example, the base station 505 may perform the beam refinement procedure using the codebook that is based on an estimated distance to the UE 515 (e.g., using the codebook that is associated with the SSB indicated by the UE 515 at 535 and is configured for beamforming at the estimated distance).

At 545, the base station 505 may transmit a reply message (e.g., to the refinement request message received at 535) declining to initiate the beam refinement procedure. For example, the base station 505 may decline the beam refinement procedure based on an estimated distance to the UE 515 (e.g., where the estimated distance of the UE 515 is the transmission distance range associated with the codebook the base station 505 used to transmit the SSB indicated by the UE 515 at 535).

At 550, the base station 505 may transmit messages to the UE 515 using the transmit beam and codebook associated with the SSB indicated to the base station 505 by the UE 515 at 535.

Figure 6:
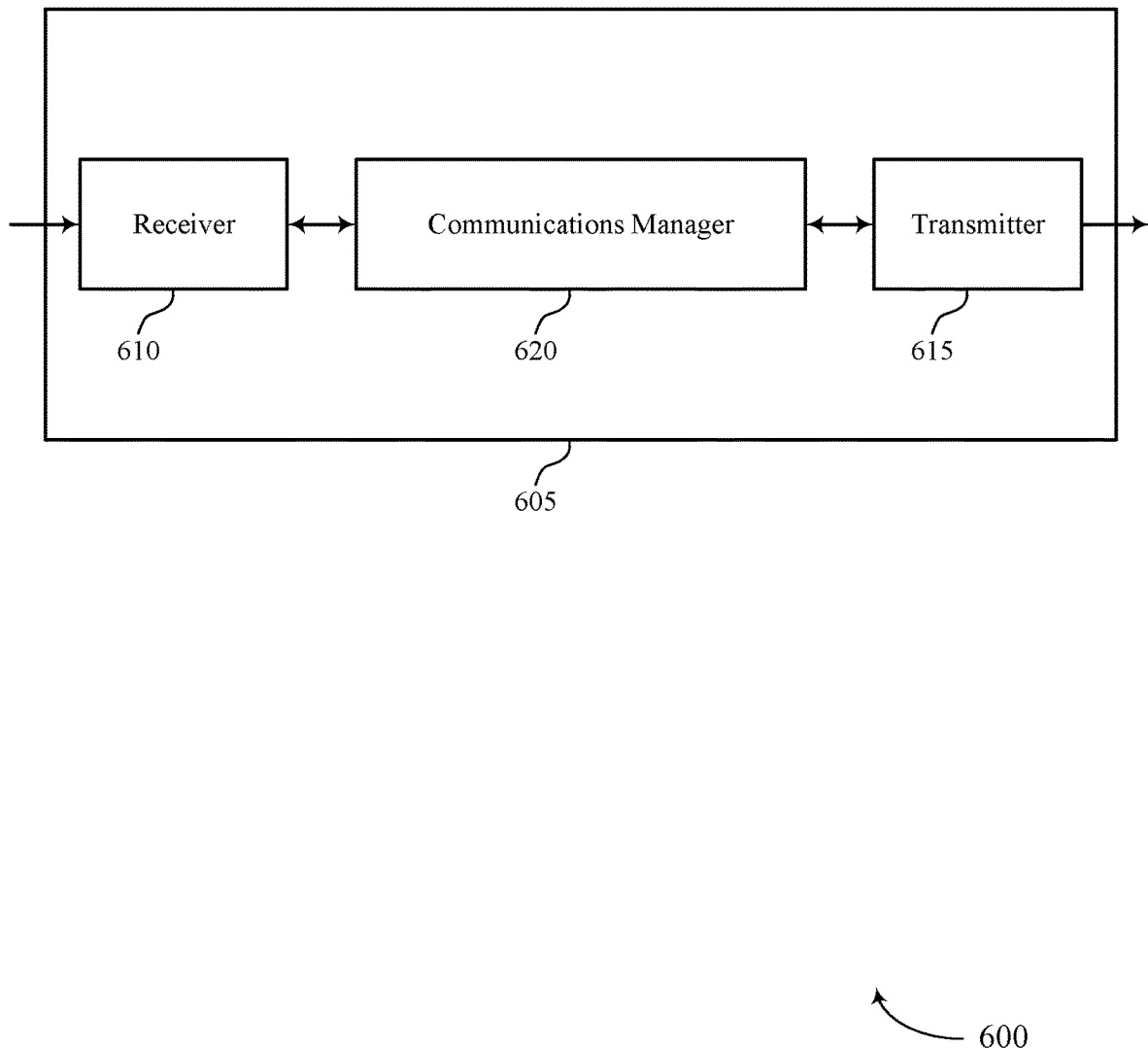
FIGS. 6 and 7 show block diagrams of devices that support communications using multiple distance-dependent analog beamforming codebooks in accordance with aspects of the present disclosure.

FIG. 6 shows a block diagram 600 of a device 605 that supports communications using multiple distance-dependent analog beamforming codebooks in accordance with aspects of the present disclosure. The device 605 may be an example of aspects of a base station 105 as described herein (e.g., such as a network entity). The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to communications using multiple distance-dependent analog beamforming codebooks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to communications using multiple distance-dependent analog beamforming codebooks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of communications using multiple distance-dependent analog beamforming codebooks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. For example, the communications manager 620 may be configured as or otherwise support a means for transmitting a control message indicating an SSB burst set. The communications manager 620 may be configured as or otherwise support a means for transmitting, using a first codebook configured for beamforming at a first transmission distance range, a first set of SSBs of the SSB burst set via a first set of multiple transmit beams. The communications manager 620 may be configured as or otherwise support a means for transmitting, using a second codebook configured for beamforming at a second transmission distance range, a second set of SSBs of the SSB burst set via a second set of multiple transmit beams. The communications manager 620 may be configured as or otherwise support a means for receiving, from a UE and based on transmitting the first set of SSBs and the second set of SSBs, an indication of a first SSB from the first set of SSBs or the second set of SSBs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more improved reliability of transmissions.

Figure 7:
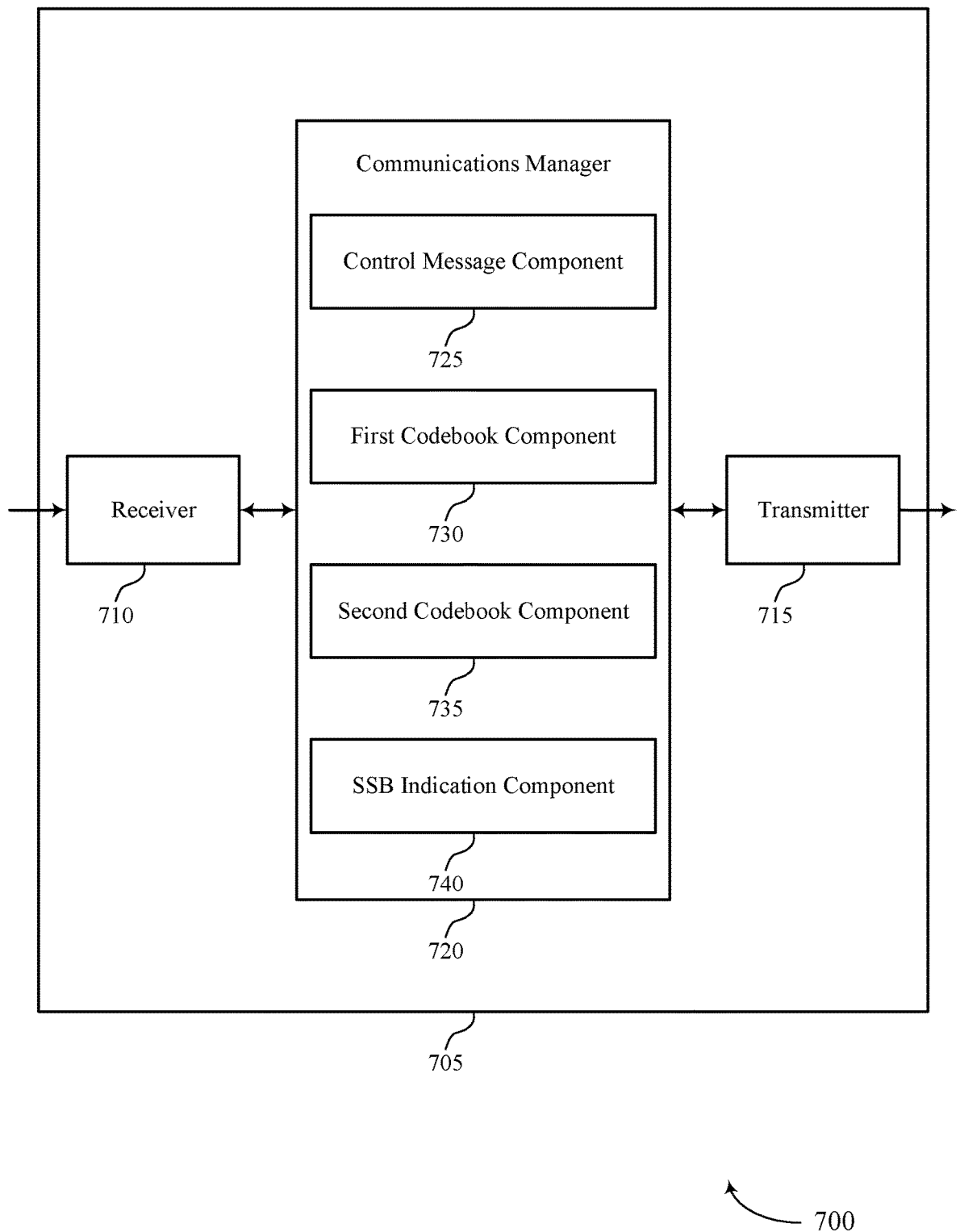

FIG. 7 shows a block diagram 700 of a device 705 that supports communications using multiple distance-dependent analog beamforming codebooks in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to communications using multiple distance-dependent analog beamforming codebooks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to communications using multiple distance-dependent analog beamforming codebooks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of communications using multiple distance-dependent analog beamforming codebooks as described herein. For example, the communications manager 720 may include a control message component 725, a first codebook component 730, a second codebook component 735, an SSB indication component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a base station in accordance with examples as disclosed herein. The control message component 725 may be configured as or otherwise support a means for transmitting a control message indicating an SSB burst set. The first codebook component 730 may be configured as or otherwise support a means for transmitting, using a first codebook configured for beamforming at a first transmission distance range, a first set of SSBs of the SSB burst set via a first set of multiple transmit beams. The second codebook component 735 may be configured as or otherwise support a means for transmitting, using a second codebook configured for beamforming at a second transmission distance range, a second set of SSBs of the SSB burst set via a second set of multiple transmit beams. The SSB indication component 740 may be configured as or otherwise support a means for receiving, from a UE and based on transmitting the first set of SSBs and the second set of SSBs, an indication of a first SSB from the first set of SSBs or the second set of SSBs.

Figure 8:
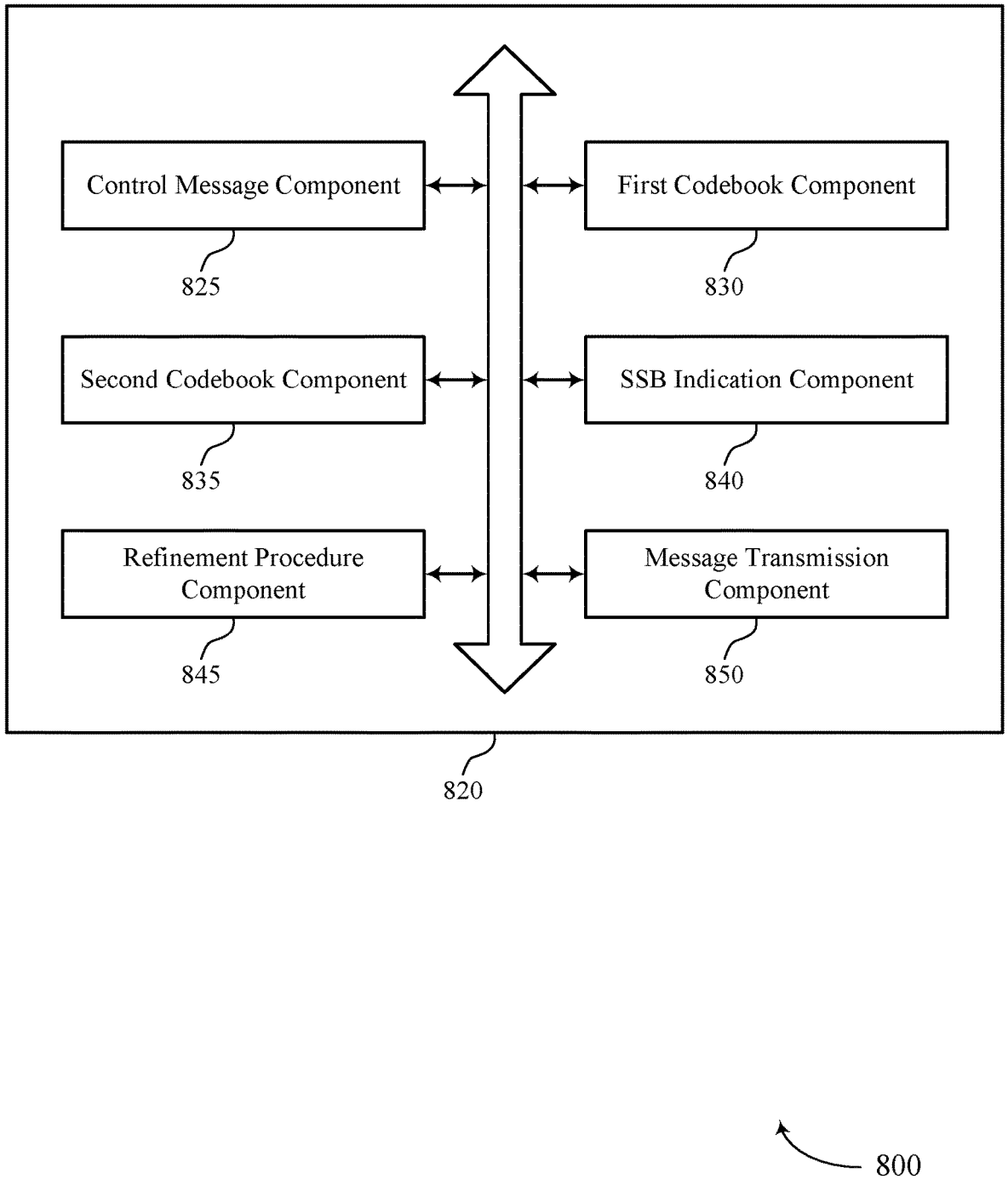
FIG. 8 shows a block diagram of a communications manager that supports communications using multiple distance-dependent analog beamforming codebooks in accordance with aspects of the present disclosure.

FIG. 8 shows a block diagram 800 of a communications manager 820 that supports communications using multiple distance-dependent analog beamforming codebooks in accordance with aspects of the present disclosure. The communications manager 820 may be an example of aspects of a communications manager 620, a communications manager 720, or both, as described herein. The communications manager 820, or various components thereof, may be an example of means for performing various aspects of communications using multiple distance-dependent analog beamforming codebooks as described herein. For example, the communications manager 820 may include a control message component 825, a first codebook component 830, a second codebook component 835, an SSB indication component 840, a refinement procedure component 845, a message transmission component 850, or any combination thereof. Each of these components may communicate, directly or indirectly, with one another (e.g., via one or more buses).

The communications manager 820 may support wireless communication at a base station in accordance with examples as disclosed herein. The control message component 825 may be configured as or otherwise support a means for transmitting a control message indicating an SSB burst set. The first codebook component 830 may be configured as or otherwise support a means for transmitting, using a first codebook configured for beamforming at a first transmission distance range, a first set of SSBs of the SSB burst set via a first set of multiple transmit beams. The second codebook component 835 may be configured as or otherwise support a means for transmitting, using a second codebook configured for beamforming at a second transmission distance range, a second set of SSBs of the SSB burst set via a second set of multiple transmit beams. The SSB indication component 840 may be configured as or otherwise support a means for receiving, from a UE and based on transmitting the first set of SSBs and the second set of SSBs, an indication of a first SSB from the first set of SSBs or the second set of SSBs.

In some examples, the refinement procedure component 845 may be configured as or otherwise support a means for receiving, from the UE, a refinement request message requesting initiation of a beam refinement procedure. In some examples, the refinement procedure component 845 may be configured as or otherwise support a means for transmitting, to the UE, a reply message declining to initiate the beam refinement procedure based on an estimated distance to the UE that is associated with the first SSB.

In some examples, the refinement procedure component 845 may be configured as or otherwise support a means for receiving, from the UE, a refinement request message requesting initiation of a beam refinement procedure. In some examples, the refinement procedure component 845 may be configured as or otherwise support a means for performing the beam refinement procedure using at least one of the first codebook, or the second codebook, or both, based on an estimated distance to the UE that is associated with the first SSB.

In some examples, to support performing the beam refinement procedure, the refinement procedure component 845 may be configured as or otherwise support a means for performing the beam refinement procedure with the UE using the first codebook configured for beamforming at the first transmission distance range based on the first transmission distance range being greater than the second transmission distance range.

In some examples, to support transmitting the control message, the control message component 825 may be configured as or otherwise support a means for transmitting the control message indicating a first number of repetitions in the first set of SSBs and indicating a second number of repetitions in the second set of SSBs.

In some examples, the first number of repetitions is smaller than the second number of repetitions based on the first transmission distance range being greater than the second transmission distance range.

In some examples, the message transmission component 850 may be configured as or otherwise support a means for communicating a message to the UE using a first transmission beam of one of the first set of multiple transmit beams or one of the second set of multiple transmit beams based on the indication.

In some examples, the message transmission component 850 may be configured as or otherwise support a means for transmitting, to the UE, a message using a transmission beam of one of the first codebook or the second codebook via a subset of a set of multiple antenna elements of an antenna panel based on an estimated distance to the UE that is associated with the first SSB.

In some examples, transmitting the first set of SSBs includes transmitting the first set of SSBs using a first quantity of transmission elements based on using the first codebook configured for beamforming at the first transmission distance range and the first transmission distance range being greater than the second transmission distance range. In some examples, transmitting the second set of SSBs includes transmitting the second set of SSBs using a second quantity of the transmission elements that is less than the first quantity of the transmission elements based on using the second codebook configured for beamforming at the second transmission distance range and the second transmission distance range being less than the first transmission distance range.

In some examples, to support receiving the indication, the SSB indication component 840 may be configured as or otherwise support a means for receiving a measurement report including the indication of the first SSB.

In some examples, a first quantity of the first set of multiple transmit beams is greater than a second quantity of the second set of multiple transmit beams based on the first transmission distance range being greater than the second transmission distance range.

In some examples, each of the first set of multiple transmit beams are associated with a first quantity of configurable beamwidths. In some examples, each of the second set of multiple transmit beams are associated with a second quantity of configurable beamwidths that are each wider than the first quantity of configurable beamwidths based on the first transmission distance range being greater than the second transmission distance range.

In some examples, the first set of SSBs are interspersed in a time domain with the second set of SSBs.

Figure 9:
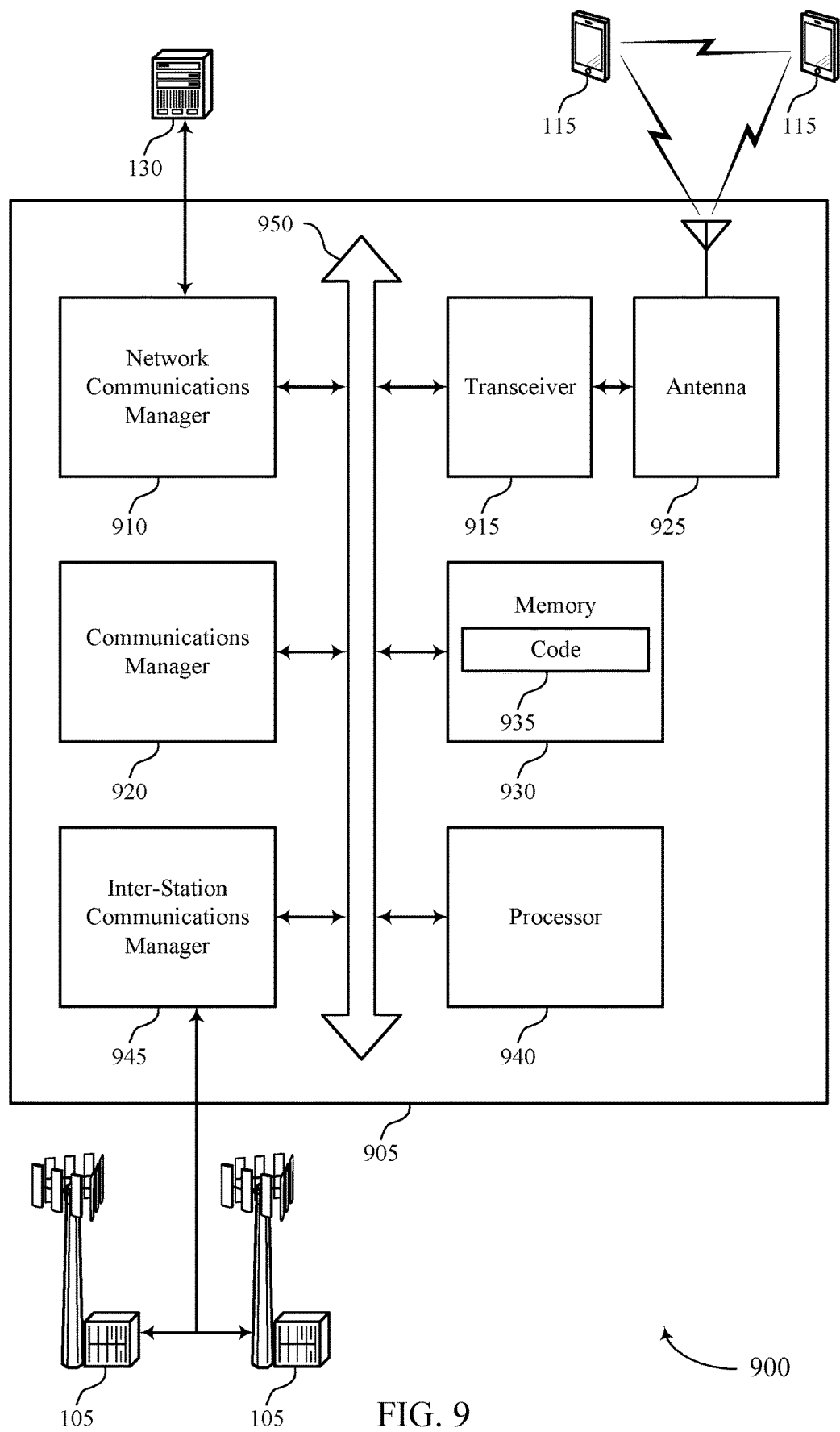
FIG. 9 shows a diagram of a system including a device that supports communications using multiple distance-dependent analog beamforming codebooks in accordance with aspects of the present disclosure.

FIG. 9 shows a diagram of a system 900 including a device 905 that supports communications using multiple distance-dependent analog beamforming codebooks in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting communications using multiple distance-dependent analog beamforming codebooks). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a base station in accordance with examples as disclosed herein. For example, the communications manager 920 may be configured as or otherwise support a means for transmitting a control message indicating an SSB burst set. The communications manager 920 may be configured as or otherwise support a means for transmitting, using a first codebook configured for beamforming at a first transmission distance range, a first set of SSBs of the SSB burst set via a first set of multiple transmit beams. The communications manager 920 may be configured as or otherwise support a means for transmitting, using a second codebook configured for beamforming at a second transmission distance range, a second set of SSBs of the SSB burst set via a second set of multiple transmit beams. The communications manager 920 may be configured as or otherwise support a means for receiving, from a UE and based on transmitting the first set of SSBs and the second set of SSBs, an indication of a first SSB from the first set of SSBs or the second set of SSBs.

By including or configuring the communications manager 920 in accordance with examples as described herein, the device 905 may support techniques for improved communication reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of communications using multiple distance-dependent analog beamforming codebooks as described herein, or the processor 940 and the memory 930 may be otherwise configured to perform or support such operations.

Figure 10:
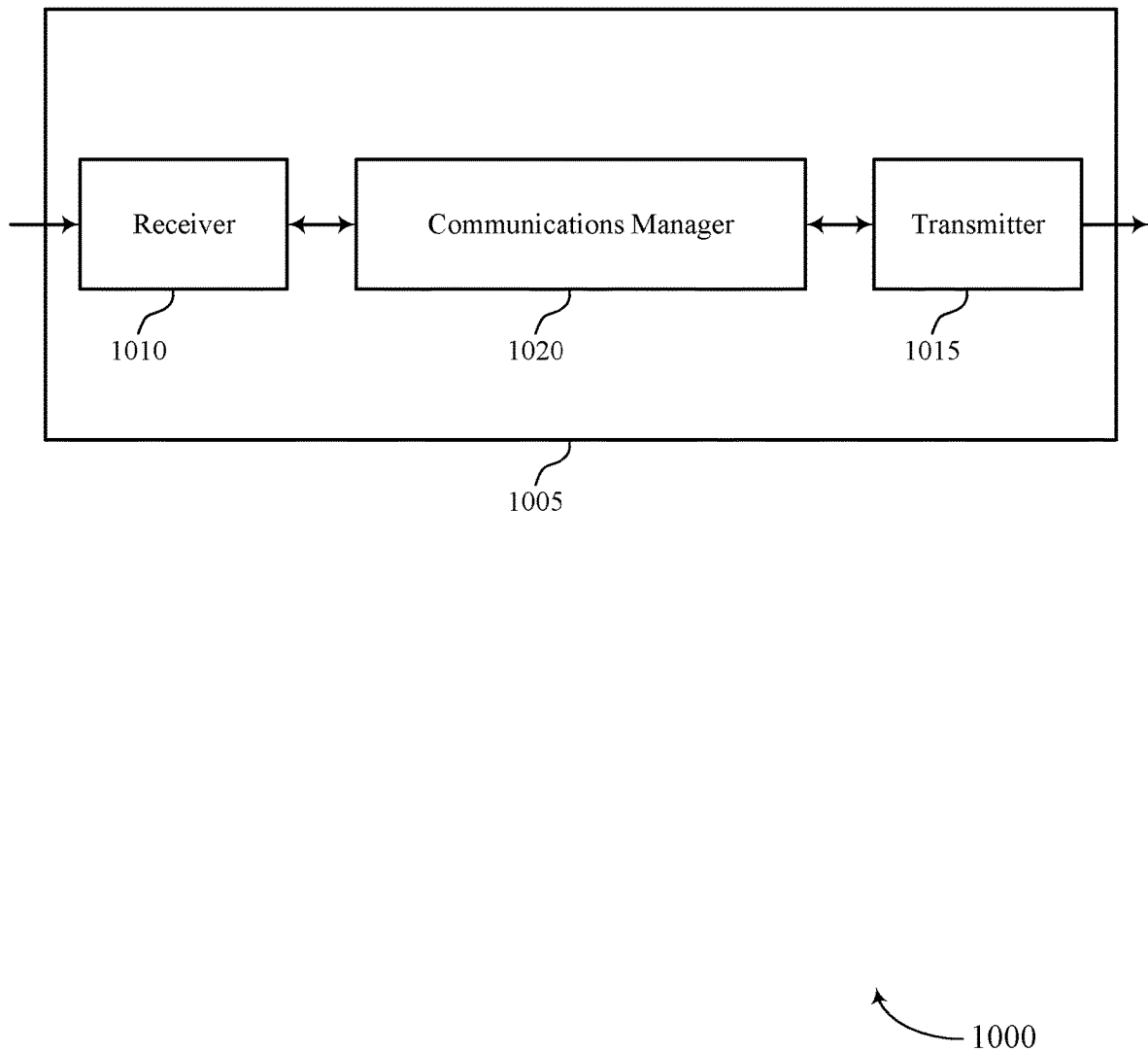
FIGS. 10 and 11 show block diagrams of devices that support communications using multiple distance-dependent analog beamforming codebooks in accordance with aspects of the present disclosure.

FIG. 10 shows a block diagram 1000 of a device 1005 that supports communications using multiple distance-dependent analog beamforming codebooks in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to communications using multiple distance-dependent analog beamforming codebooks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to communications using multiple distance-dependent analog beamforming codebooks). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of communications using multiple distance-dependent analog beamforming codebooks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving, from a network entity, a control message indicating an SSB burst set. The communications manager 1020 may be configured as or otherwise support a means for receiving a first set of SSBs of the SSB burst set associated with a first set of multiple transmit beams at the network entity, the first set of SSBs associated with a first codebook configured for beamforming at a first transmission distance range. The communications manager 1020 may be configured as or otherwise support a means for receiving a second set of SSBs of the SSB burst set associated with a second set of multiple transmit beams at the network entity, the second set of SSBs associated with a second codebook configured for beamforming at a second transmission distance range. The communications manager 1020 may be configured as or otherwise support a means for transmitting, to the network entity and based on receiving the first set of SSBs and the second set of SSBs, an indication of a first SSB from the first set of SSBs or the second set of SSBs.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improved communication reliability.

Figure 11:
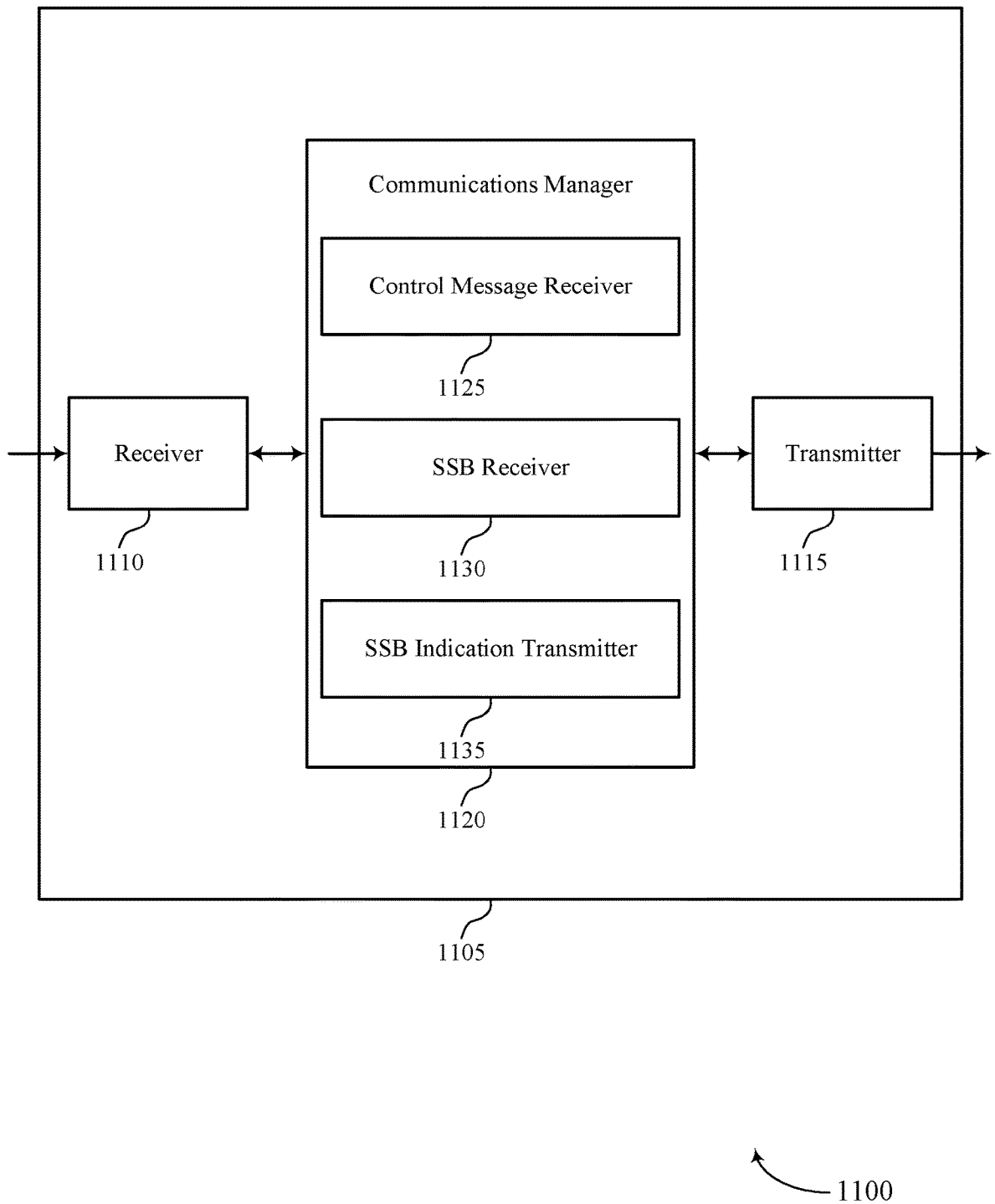

FIG. 11 shows a block diagram 1100 of a device 1105 that supports communications using multiple distance-dependent analog beamforming codebooks in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to communications using multiple distance-dependent analog beamforming codebooks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to communications using multiple distance-dependent analog beamforming codebooks). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of communications using multiple distance-dependent analog beamforming codebooks as described herein. For example, the communications manager 1120 may include a control message receiver 1125, an SSB receiver 1130, an SSB indication transmitter 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The control message receiver 1125 may be configured as or otherwise support a means for receiving, from a network entity, a control message indicating an SSB burst set. The SSB receiver 1130 may be configured as or otherwise support a means for receiving a first set of SSBs of the SSB burst set associated with a first set of multiple transmit beams at the network entity, the first set of SSBs associated with a first codebook configured for beamforming at a first transmission distance range. The SSB receiver 1130 may be configured as or otherwise support a means for receiving a second set of SSBs of the SSB burst set associated with a second set of multiple transmit beams at the network entity, the second set of SSBs associated with a second codebook configured for beamforming at a second transmission distance range. The SSB indication transmitter 1135 may be configured as or otherwise support a means for transmitting, to the network entity and based on receiving the first set of SSBs and the second set of SSBs, an indication of a first SSB from the first set of SSBs or the second set of SSBs.

Figure 12:
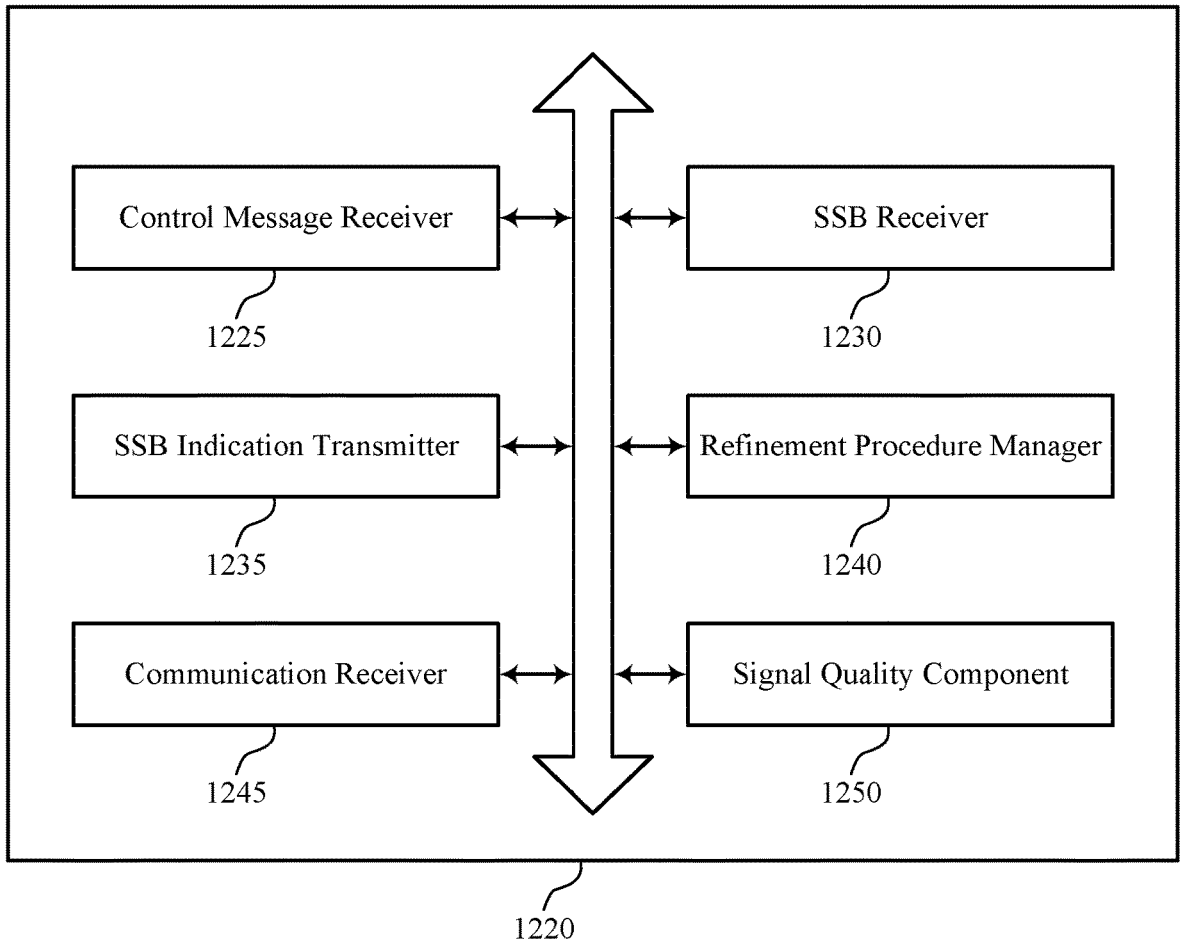
FIG. 12 shows a block diagram of a communications manager that supports communications using multiple distance-dependent analog beamforming codebooks in accordance with aspects of the present disclosure.

FIG. 12 shows a block diagram 1200 of a communications manager 1220 that supports communications using multiple distance-dependent analog beamforming codebooks in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of communications using multiple distance-dependent analog beamforming codebooks as described herein. For example, the communications manager 1220 may include a control message receiver 1225, an SSB receiver 1230, an SSB indication transmitter 1235, a refinement procedure manager 1240, a communication receiver 1245, a signal quality component 1250, or any combination thereof. Each of these components may communicate, directly or indirectly, with one another (e.g., via one or more buses).

The communications manager 1220 may support wireless communication at a UE in accordance with examples as disclosed herein. The control message receiver 1225 may be configured as or otherwise support a means for receiving, from a network entity, a control message indicating an SSB burst set. The SSB receiver 1230 may be configured as or otherwise support a means for receiving a first set of SSBs of the SSB burst set associated with a first set of multiple transmit beams at the network entity, the first set of SSBs associated with a first codebook configured for beamforming at a first transmission distance range. In some examples, the SSB receiver 1230 may be configured as or otherwise support a means for receiving a second set of SSBs of the SSB burst set associated with a second set of multiple transmit beams at the network entity, the second set of SSBs associated with a second codebook configured for beamforming at a second transmission distance range. The SSB indication transmitter 1235 may be configured as or otherwise support a means for transmitting, to the network entity and based on receiving the first set of SSBs and the second set of SSBs, an indication of a first SSB from the first set of SSBs or the second set of SSBs.

In some examples, the refinement procedure manager 1240 may be configured as or otherwise support a means for transmitting, to the network entity, a refinement request message requesting initiation of a beam refinement procedure. In some examples, the refinement procedure manager 1240 may be configured as or otherwise support a means for receiving, from the network entity, a reply message declining to initiate the beam refinement procedure based on transmitting the refinement request message.

In some examples, the refinement procedure manager 1240 may be configured as or otherwise support a means for transmitting, to the network entity, a refinement request message requesting initiation of a beam refinement procedure. In some examples, the refinement procedure manager 1240 may be configured as or otherwise support a means for performing the beam refinement procedure based on transmitting the refinement request message.

In some examples, to support performing the beam refinement procedure, the refinement procedure manager 1240 may be configured as or otherwise support a means for performing the beam refinement procedure with the network entity based on the first plurality of transmit beams using the first codebook configured for beamforming at the first transmission distance range and the first transmission distance range being greater than the second transmission distance range.

In some examples, to support receiving the control message, the control message receiver 1225 may be configured as or otherwise support a means for receiving the control message indicating a first number of repetitions in the first set of SSBs and indicating a second number of repetitions in the second set of SSBs.

In some examples, the first number of repetitions is smaller than the second number of repetitions based on the first transmission distance range being greater than the second transmission distance range.

In some examples, the communication receiver 1245 may be configured as or otherwise support a means for receiving communications from the network entity transmitted using a first transmission beam of one of the first set of multiple transmit beams or one of the second set of multiple transmit beams based on the indication.

In some examples, to support transmitting the indication, the SSB indication transmitter 1235 may be configured as or otherwise support a means for transmitting a measurement report including the indication of the first SSB.

In some examples, the signal quality component 1250 may be configured as or otherwise support a means for detecting signal qualities associated with each of the first set of SSBs and the second set of SSBs, where the first SSB is associated with a higher channel quality than remaining SSBs from the first set of SSBs and the second set of SSBs.

In some examples, a first quantity of the first set of multiple transmit beams is greater than a second quantity of the second set of multiple transmit beams based on the first transmission distance range being greater than the second transmission distance range.

In some examples, each of the first set of multiple transmit beams are associated with a first quantity of configurable beamwidths. In some examples, each of the second set of multiple transmit beams are associate with a second quantity of configurable beamwidths that are each wider than the first quantity of configurable beamwidths based on the first transmission distance range being greater than the second transmission distance range.

In some examples, the first set of SSBs are interspersed in a time domain with the second set of SSBs.

Figure 13:
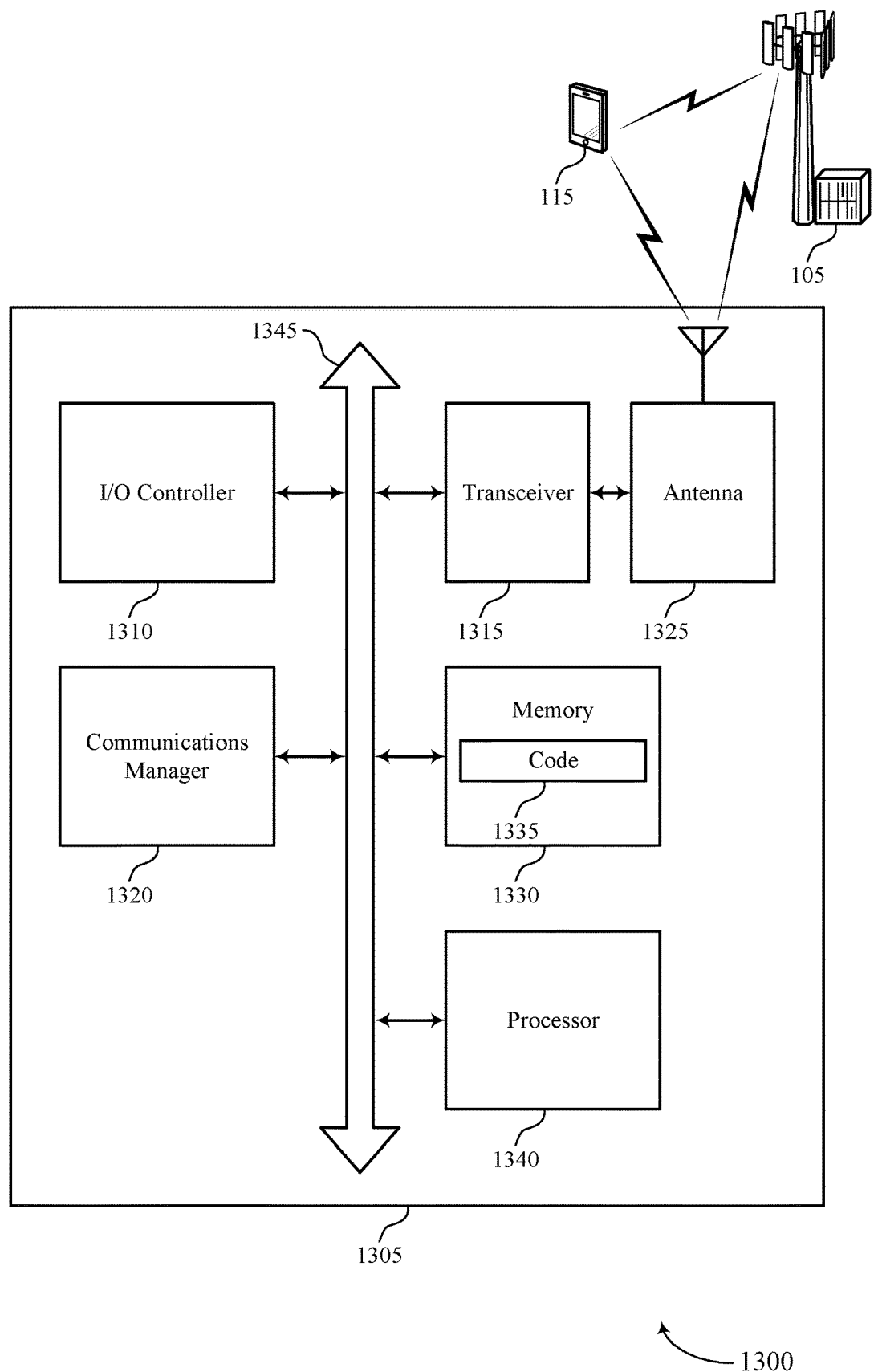
FIG. 13 shows a diagram of a system including a device that supports communications using multiple distance-dependent analog beamforming codebooks in accordance with aspects of the present disclosure.

FIG. 13 shows a diagram of a system 1300 including a device 1305 that supports communications using multiple distance-dependent analog beamforming codebooks in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting communications using multiple distance-dependent analog beamforming codebooks). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a network entity, a control message indicating an SSB burst set. The communications manager 1320 may be configured as or otherwise support a means for receiving a first set of SSBs of the SSB burst set associated with a first set of multiple transmit beams at the network entity, the first set of SSBs associated with a first codebook configured for beamforming at a first transmission distance range. The communications manager 1320 may be configured as or otherwise support a means for receiving a second set of SSBs of the SSB burst set associated with a second set of multiple transmit beams at the network entity, the second set of SSBs associated with a second codebook configured for beamforming at a second transmission distance range. The communications manager 1320 may be configured as or otherwise support a means for transmitting, to the network entity and based on receiving the first set of SSBs and the second set of SSBs, an indication of a first SSB from the first set of SSBs or the second set of SSBs.

By including or configuring the communications manager 1320 in accordance with examples as described herein, the device 1305 may support techniques for improved communication reliability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of communications using multiple distance-dependent analog beamforming codebooks as described herein, or the processor 1340 and the memory 1330 may be otherwise configured to perform or support such operations.

Figure 14:
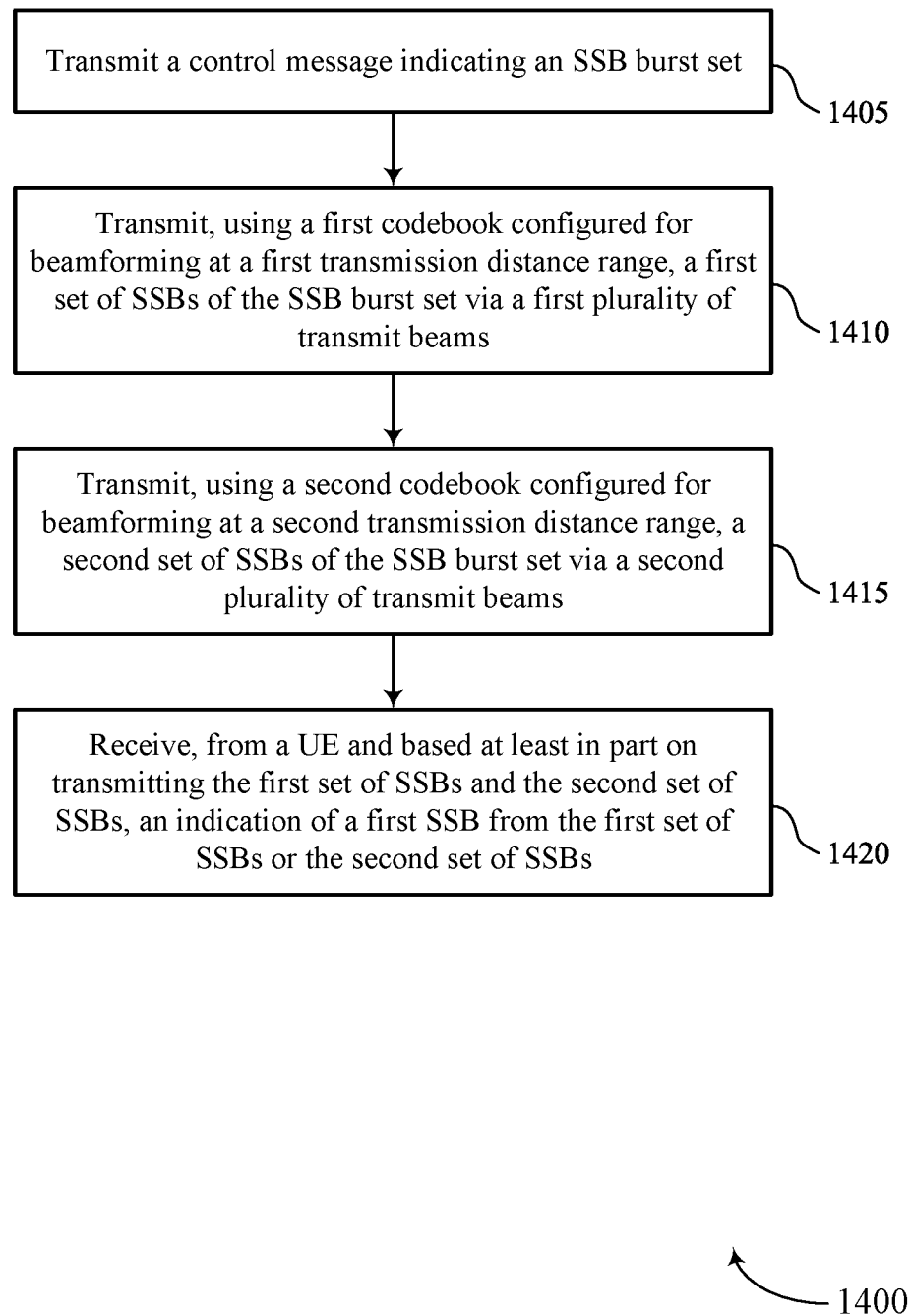
FIGS. 14 through 17 show flowcharts illustrating methods that support communications using multiple distance-dependent analog beamforming codebooks in accordance with aspects of the present disclosure.

FIG. 14 shows a flowchart illustrating a method 1400 that supports communications using multiple distance-dependent analog beamforming codebooks in accordance with aspects of the present disclosure. The operations of the method 1400 may be implemented by a base station or its components as described herein (e.g., such as by a network entity). For example, the operations of the method 1400 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1405, the method may include transmitting a control message indicating an SSB burst set. The operations of 1405 may be performed in accordance with examples as disclosed herein. In some examples, aspects of the operations of 1405 may be performed by a control message component 825 as described with reference to FIG. 8.

At 1410, the method may include transmitting, using a first codebook configured for beamforming at a first transmission distance range, a first set of SSBs of the SSB burst set via a first set of multiple transmit beams. The operations of 1410 may be performed in accordance with examples as disclosed herein. In some examples, aspects of the operations of 1410 may be performed by a first codebook component 830 as described with reference to FIG. 8.

At 1415, the method may include transmitting, using a second codebook configured for beamforming at a second transmission distance range, a second set of SSBs of the SSB burst set via a second set of multiple transmit beams. The operations of 1415 may be performed in accordance with examples as disclosed herein. In some examples, aspects of the operations of 1415 may be performed by a second codebook component 835 as described with reference to FIG. 8.

At 1420, the method may include receiving, from a UE and based on transmitting the first set of SSBs and the second set of SSBs, an indication of a first SSB from the first set of SSBs or the second set of SSBs. The operations of 1420 may be performed in accordance with examples as disclosed herein. In some examples, aspects of the operations of 1420 may be performed by an SSB indication component 840 as described with reference to FIG. 8.

Figure 15:
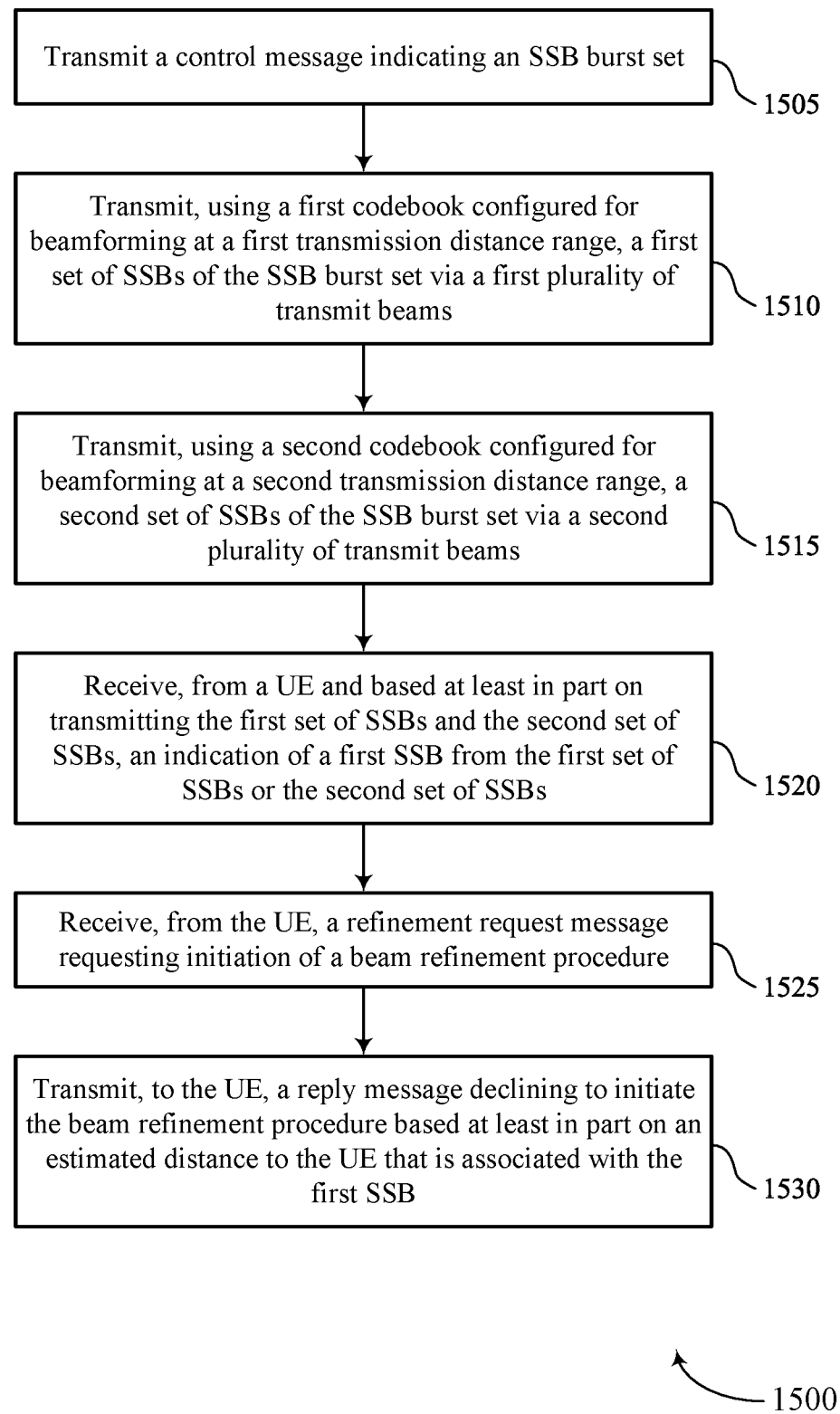

FIG. 15 shows a flowchart illustrating a method 1500 that supports communications using multiple distance-dependent analog beamforming codebooks in accordance with aspects of the present disclosure. The operations of the method 1500 may be implemented by a base station or its components as described herein (e.g., such as by a network entity). For example, the operations of the method 1500 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1505, the method may include transmitting a control message indicating an SSB burst set. The operations of 1505 may be performed in accordance with examples as disclosed herein. In some examples, aspects of the operations of 1505 may be performed by a control message component 825 as described with reference to FIG. 8.

At 1510, the method may include transmitting, using a first codebook configured for beamforming at a first transmission distance range, a first set of SSBs of the SSB burst set via a first set of multiple transmit beams. The operations of 1510 may be performed in accordance with examples as disclosed herein. In some examples, aspects of the operations of 1510 may be performed by a first codebook component 830 as described with reference to FIG. 8.

At 1515, the method may include transmitting, using a second codebook configured for beamforming at a second transmission distance range, a second set of SSBs of the SSB burst set via a second set of multiple transmit beams. The operations of 1515 may be performed in accordance with examples as disclosed herein. In some examples, aspects of the operations of 1515 may be performed by a second codebook component 835 as described with reference to FIG. 8.

At 1520, the method may include receiving, from a UE and based on transmitting the first set of SSBs and the second set of SSBs, an indication of a first SSB from the first set of SSBs or the second set of SSBs. The operations of 1520 may be performed in accordance with examples as disclosed herein. In some examples, aspects of the operations of 1520 may be performed by an SSB indication component 840 as described with reference to FIG. 8.

At 1525, the method may include receiving, from the UE, a refinement request message requesting initiation of a beam refinement procedure. The operations of 1525 may be performed in accordance with examples as disclosed herein. In some examples, aspects of the operations of 1525 may be performed by a refinement procedure component 845 as described with reference to FIG. 8.

At 1530, the method may include transmitting, to the UE, a reply message declining to initiate the beam refinement procedure based on an estimated distance to the UE that is associated with the first SSB. The operations of 1530 may be performed in accordance with examples as disclosed herein. In some examples, aspects of the operations of 1530 may be performed by a refinement procedure component 845 as described with reference to FIG. 8.

Figure 16:
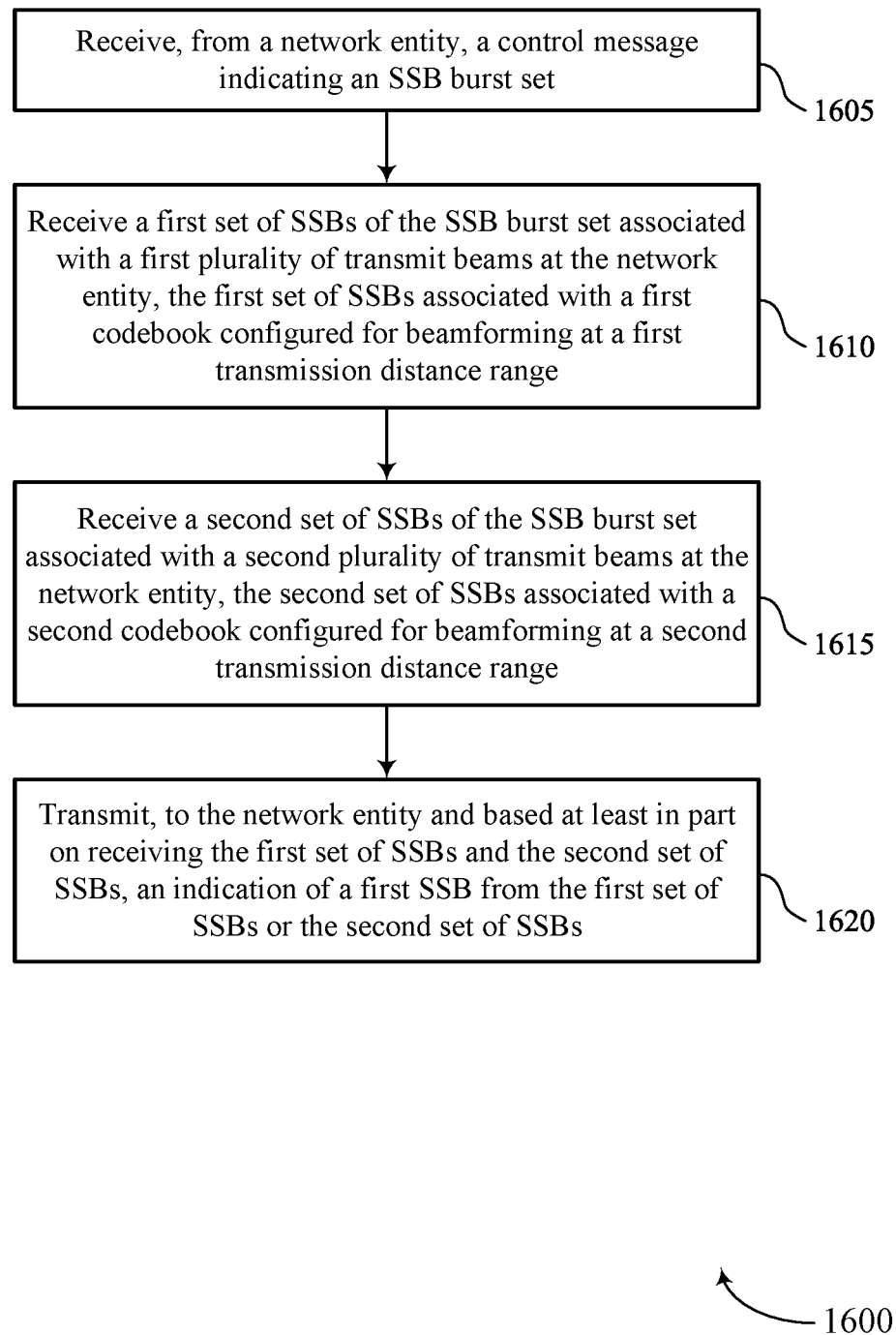

FIG. 16 shows a flowchart illustrating a method 1600 that supports communications using multiple distance-dependent analog beamforming codebooks in accordance with aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1605, the method may include receiving, from a network entity, a control message indicating an SSB burst set. The operations of 1605 may be performed in accordance with examples as disclosed herein. In some examples, aspects of the operations of 1605 may be performed by a control message receiver 1225 as described with reference to FIG. 12.

At 1610, the method may include receiving a first set of SSBs of the SSB burst set associated with a first set of multiple transmit beams at the network entity, the first set of SSBs associated with a first codebook configured for beamforming at a first transmission distance range. The operations of 1610 may be performed in accordance with examples as disclosed herein. In some examples, aspects of the operations of 1610 may be performed by an SSB receiver 1230 as described with reference to FIG. 12.

At 1615, the method may include receiving a second set of SSBs of the SSB burst set associated with a second set of multiple transmit beams at the network entity, the second set of SSBs associated with a second codebook configured for beamforming at a second transmission distance range. The operations of 1615 may be performed in accordance with examples as disclosed herein. In some examples, aspects of the operations of 1615 may be performed by an SSB receiver 1230 as described with reference to FIG. 12.

At 1620, the method may include transmitting, to the network entity and based on receiving the first set of SSBs and the second set of SSBs, an indication of a first SSB from the first set of SSBs or the second set of SSBs. The operations of 1620 may be performed in accordance with examples as disclosed herein. In some examples, aspects of the operations of 1620 may be performed by an SSB indication transmitter 1235 as described with reference to FIG. 12.

Figure 17:
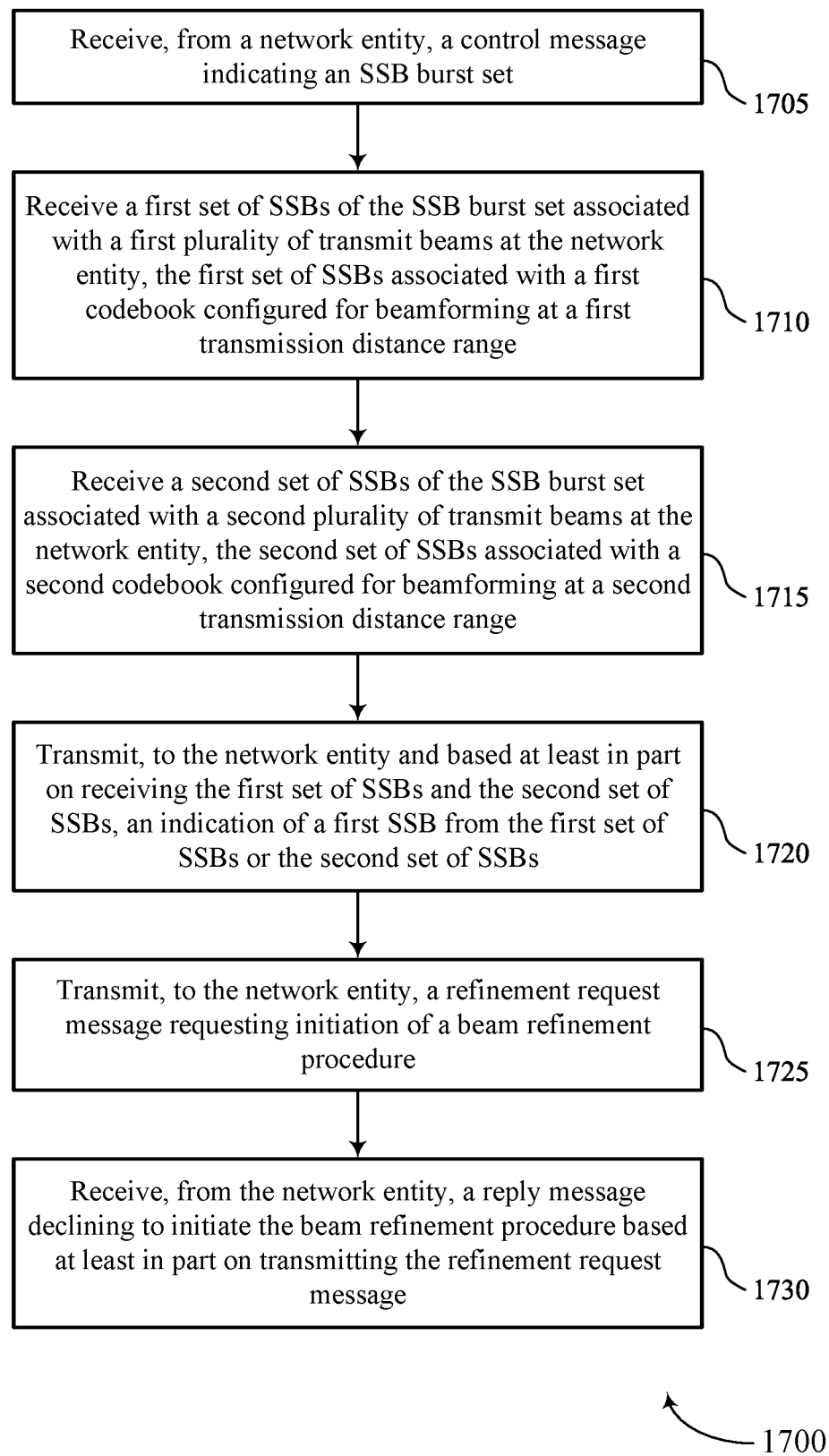

FIG. 17 shows a flowchart illustrating a method 1700 that supports communications using multiple distance-dependent analog beamforming codebooks in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1705, the method may include receiving, from a network entity, a control message indicating an SSB burst set. The operations of 1705 may be performed in accordance with examples as disclosed herein. In some examples, aspects of the operations of 1705 may be performed by a control message receiver 1225 as described with reference to FIG. 12.

At 1710, the method may include receiving a first set of SSBs of the SSB burst set associated with a first set of multiple transmit beams at the network entity, the first set of SSBs associated with a first codebook configured for beamforming at a first transmission distance range. The operations of 1710 may be performed in accordance with examples as disclosed herein. In some examples, aspects of the operations of 1710 may be performed by an SSB receiver 1230 as described with reference to FIG. 12.

At 1715, the method may include receiving a second set of SSBs of the SSB burst set associated with a second set of multiple transmit beams at the network entity, the second set of SSBs associated with a second codebook configured for beamforming at a second transmission distance range. The operations of 1715 may be performed in accordance with examples as disclosed herein. In some examples, aspects of the operations of 1715 may be performed by an SSB receiver 1230 as described with reference to FIG. 12.

At 1720, the method may include transmitting, to the network entity and based on receiving the first set of SSBs and the second set of SSBs, an indication of a first SSB from the first set of SSBs or the second set of SSBs. The operations of 1720 may be performed in accordance with examples as disclosed herein. In some examples, aspects of the operations of 1720 may be performed by an SSB indication transmitter 1235 as described with reference to FIG. 12.

At 1725, the method may include transmitting, to the network entity, a refinement request message requesting initiation of a beam refinement procedure. The operations of 1725 may be performed in accordance with examples as disclosed herein. In some examples, aspects of the operations of 1725 may be performed by a refinement procedure manager 1240 as described with reference to FIG. 12.

At 1730, the method may include receiving, from the network entity, a reply message declining to initiate the beam refinement procedure based on transmitting the refinement request message. The operations of 1730 may be performed in accordance with examples as disclosed herein. In some examples, aspects of the operations of 1730 may be performed by a refinement procedure manager 1240 as described with reference to FIG. 12.

The following provides an overview of aspects of the present disclosure:

Aspect 1: A method for wireless communication at a network entity, comprising: transmitting a control message indicating an SSB burst set; transmitting, using a first codebook configured for beamforming at a first transmission distance range, a first set of SSBs of the SSB burst set via a first plurality of transmit beams; transmitting, using a second codebook configured for beamforming at a second transmission distance range, a second set of SSBs of the SSB burst set via a second plurality of transmit beams; and receiving, from a UE and based at least in part on transmitting the first set of SSBs and the second set of SSBs, an indication of a first SSB from the first set of SSBs or the second set of SSBs.

Aspect 2: The method of aspect 1, further comprising: receiving, from the UE, a refinement request message requesting initiation of a beam refinement procedure; and transmitting, to the UE, a reply message declining to initiate the beam refinement procedure based at least in part on an estimated distance to the UE that is associated with the first SSB.

Aspect 3: The method of aspect 1, further comprising: receiving, from the UE, a refinement request message requesting initiation of a beam refinement procedure; and performing the beam refinement procedure using at least one of the first codebook, or the second codebook, or both, based at least in part on an estimated distance to the UE that is associated with the first SSB.

Aspect 4: The method of aspect 3, wherein performing the beam refinement procedure further comprises: performing the beam refinement procedure with the UE using the first codebook configured for beamforming at the first transmission distance range based at least in part on the first transmission distance range being greater than the second transmission distance range.

Aspect 5: The method of any of aspects 1 through 4, wherein transmitting the control message comprises: transmitting the control message indicating a first repetition period for transmitting the first set of SSBs and indicating a second repetition period for transmitting the second set of SSBs.

Aspect 6: The method of aspect 5, wherein the first repetition period is smaller than the second repetition period based at least in part on the first transmission distance range being greater than the second transmission distance range.

Aspect 7: The method of any of aspects 1 through 6, further comprising: communicating a message to the UE using a first transmission beam of one of the first plurality of transmit beams or one of the second plurality of transmit beams based at least in part on the indication.

Aspect 8: The method of any of aspects 1 through 7, further comprising: transmitting, to the UE, a message using a transmission beam of one of the first codebook or the second codebook via a subset of a plurality of antenna elements of an antenna panel based at least in part on an estimated distance to the UE that is associated with the first SSB.

Aspect 9: The method of any of aspects 1 through 8, wherein transmitting the first set of SSBs comprises transmitting the first set of SSBs using a first quantity of transmission elements based at least in part on using the first codebook configured for beamforming at the first transmission distance range and the first transmission distance range being greater than the second transmission distance range; and transmitting the second set of SSBs comprises transmitting the second set of SSBs using a second quantity of the transmission elements that is less than the first quantity of transmission elements based at least in part on using the second codebook configured for beamforming at the second transmission distance range and the second transmission distance range being less than the first transmission distance range.

Aspect 10: The method of any of aspects 1 through 9, wherein receiving the indication comprises: receiving a measurement report comprising the indication of the first SSB.

Aspect 11: The method of any of aspects 1 through 10, wherein a first quantity of the first plurality of transmit beams is greater than a second quantity of the second plurality of transmit beams based at least in part on the first transmission distance range being greater than the second transmission distance range.

Aspect 12: The method of any of aspects 1 through 11, wherein each of the first plurality of transmit beams are associated with a first quantity of configurable beamwidths; and each of the second plurality of transmit beams are associated with a second quantity of configurable beamwidths that are each wider than the first quantity of configurable beamwidths based at least in part on the first transmission distance range being greater than the second transmission distance range.

Aspect 13: The method of any of aspects 1 through 12, wherein the first set of SSBs are interspersed in a time domain with the second set of SSBs.

Aspect 14: A method for wireless communication at a UE, comprising: receiving, from a network entity, a control message indicating an SSB burst set; receiving a first set of SSBs of the SSB burst set associated with a first plurality of transmit beams at the network entity, the first set of SSBs associated with a first codebook configured for beamforming at a first transmission distance range; receiving a second set of SSBs of the SSB burst set associated with a second plurality of transmit beams at the network entity, the second set of SSBs associated with a second codebook configured for beamforming at a second transmission distance range; and transmitting, to the network entity and based at least in part on receiving the first set of SSBs and the second set of SSBs, an indication of a first SSB from the first set of SSBs or the second set of SSBs.

Aspect 15: The method of aspect 14, further comprising: transmitting, to the network entity, a refinement request message requesting initiation of a beam refinement procedure; and receiving, from the network entity, a reply message declining to initiate the beam refinement procedure based at least in part on transmitting the refinement request message.

Aspect 16: The method of aspect 14, further comprising: transmitting, to the network entity, a refinement request message requesting initiation of a beam refinement procedure; and performing the beam refinement procedure based at least in part on transmitting the refinement request message.

Aspect 17: The method of aspect 16, wherein performing the beam refinement procedure comprises: performing the beam refinement procedure with the network entity based at least in part on the first plurality of transmit beams using the first codebook configured for beamforming at the first transmission distance range and the first transmission distance range being greater than the second transmission distance range.

Aspect 18: The method of any of aspects 14 through 17, wherein receiving the control message comprises: receiving the control message indicating a first repetition period for receiving the first set of SSBs and indicating a repetition period for receiving the second set of SSBs.

Aspect 19: The method of aspect 18, wherein the first repetition period is smaller than the second repetition period based at least in part on the first transmission distance range being greater than the second transmission distance range.

Aspect 20: The method of any of aspects 14 through 19, further comprising: receiving communications from the network entity transmitted using a first transmission beam of one of the first plurality of transmit beams or one of the second plurality of transmit beams based at least in part on the indication.

Aspect 21: The method of any of aspects 14 through 20, wherein transmitting the indication comprises: transmitting a measurement report comprising the indication of the first SSB.

Aspect 22: The method of any of aspects 14 through 21, further comprising: detecting signal qualities associated with each of the first set of SSBs and the second set of SSBs, wherein the first SSB is associated with a higher channel quality than remaining SSBs from the first set of SSBs and the second set of SSBs.

Aspect 23: The method of any of aspects 14 through 22, wherein a first quantity of the first plurality of transmit beams is greater than a second quantity of the second plurality of transmit beams based at least in part on the first transmission distance range being greater than the second transmission distance range.

Aspect 24: The method of any of aspects 14 through 23, wherein each of the first plurality of transmit beams are associated with a first quantity of configurable beamwidths; and each of the second plurality of transmit beams are associate with a second quantity of configurable beamwidths that are each wider than the first quantity of configurable beamwidths based at least in part on the first transmission distance range being greater than the second transmission distance range.

Aspect 25: The method of any of aspects 14 through 24, wherein the first set of SSBs are interspersed in a time domain with the second set of SSBs.

Aspect 26: An apparatus for wireless communication at a network entity, comprising a processor; memory coupled with the processor; and instructions stored in the memory and executable by the processor to cause the apparatus to perform a method of any of aspects 1 through 13.

Aspect 27: An apparatus for wireless communication at a network entity, comprising at least one means for performing a method of any of aspects 1 through 13.

Aspect 28: A non-transitory computer-readable medium storing code for wireless communication at a network entity, the code comprising instructions executable by a processor to perform a method of any of aspects 1 through 13.

Aspect 29: An apparatus for wireless communication at a UE, comprising a processor; memory coupled with the processor; and instructions stored in the memory and executable by the processor to cause the apparatus to perform a method of any of aspects 14 through 25.

Aspect 30: An apparatus for wireless communication at a UE, comprising at least one means for performing a method of any of aspects 14 through 25.

Aspect 31: A non-transitory computer-readable medium storing code for wireless communication at a UE, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The invention claimed is:

1. An apparatus for wireless communication at a user equipment (UE), comprising:
a processor;
memory coupled with the processor; and
instructions stored in the memory and executable by the processor to cause the apparatus to:
receive, from a network entity, a control message indicating a synchronization signal block (SSB) burst set;
receive a first set of SSBs of the SSB burst set associated with a first plurality of transmit beams at the network entity, the first set of SSBs associated with a first codebook configured for beamforming at a first transmission distance range;
receive a second set of SSBs of the SSB burst set associated with a second plurality of transmit beams at the network entity, the second set of SSBs associated with a second codebook configured for beamforming at a second transmission distance range; and
transmit, to the network entity and based at least in part on receiving the first set of SSBs and the second set of SSBs, an indication of a first SSB from the first set of SSBs or the second set of SSBs.

2. The apparatus of claim 1, wherein the instructions are further executable by the processor to cause the apparatus to:
transmit, to the network entity, a refinement request message requesting initiation of a beam refinement procedure; and
receive, from the network entity, a reply message declining to initiate the beam refinement procedure based at least in part on transmitting the refinement request message.

3. The apparatus of claim 1, wherein the instructions are further executable by the processor to cause the apparatus to:
transmit, to the network entity, a refinement request message requesting initiation of a beam refinement procedure; and
perform the beam refinement procedure based at least in part on transmitting the refinement request message.

4. The apparatus of claim 3, wherein the instructions to perform the beam refinement procedure are executable by the processor to cause the apparatus to:

perform the beam refinement procedure with the network entity based at least in part on the first plurality of transmit beams using the first codebook configured for beamforming at the first transmission distance range and the first transmission distance range being greater than the second transmission distance range.

5. The apparatus of claim 1, wherein the instructions to receive the control message are executable by the processor to cause the apparatus to:
receive the control message indicating a first number of repetitions in the first set of SSBs and indicating a second number of repetitions in the second set of SSBs.

6. The apparatus of claim 5, wherein the first number of repetitions is smaller than the second number of repetitions based at least in part on the first transmission distance range being greater than the second transmission distance range.

7. The apparatus of claim 1, wherein the instructions are further executable by the processor to cause the apparatus to:
receive communications from the network entity transmitted using a first transmission beam of one of the first plurality of transmit beams or one of the second plurality of transmit beams based at least in part on the indication.

8. The apparatus of claim 1, wherein the instructions to transmit the indication are executable by the processor to cause the apparatus to:
transmit a measurement report comprising the indication of the first SSB.

9. The apparatus of claim 1, wherein the instructions are further executable by the processor to cause the apparatus to:
detect signal qualities associated with each of the first set of SSBs and the second set of SSBs, wherein the first SSB is associated with a higher channel quality than remaining SSBs from the first set of SSBs and the second set of SSBs.

10. The apparatus of claim 1, wherein a first quantity of the first plurality of transmit beams is greater than a second quantity of the second plurality of transmit beams based at least in part on the first transmission distance range being greater than the second transmission distance range.

11. The apparatus of claim 1, wherein:
each of the first plurality of transmit beams are associated with a first quantity of configurable beamwidths; and
each of the second plurality of transmit beams are associate with a second quantity of configurable beamwidths that are each wider than the first quantity of configurable beamwidths based at least in part on the first transmission distance range being greater than the second transmission distance range.

12. The apparatus of claim 1, wherein the first set of SSBs are interspersed in a time domain with the second set of SSBs.

13. An apparatus for wireless communication at a network entity, comprising:
a processor;
memory coupled with the processor; and
instructions stored in the memory and executable by the processor to cause the apparatus to:
transmit a control message indicating a synchronization signal block (SSB) burst set;
transmit, using a first codebook configured for beamforming at a first transmission distance range, a first set of SSBs of the SSB burst set via a first plurality of transmit beams;
transmit, using a second codebook configured for beamforming at a second transmission distance range, a second set of SSBs of the SSB burst set via a second plurality of transmit beams; and
receive, from a user equipment (UE) and based at least in part on transmitting the first set of SSBs and the second set of SSBs, an indication of a first SSB from the first set of SSBs or the second set of SSBs.

14. The apparatus of claim 13, wherein the instructions are further executable by the processor to cause the apparatus to:
receive, from the UE, a refinement request message requesting initiation of a beam refinement procedure; and
transmit, to the UE, a reply message declining to initiate the beam refinement procedure based at least in part on an estimated distance to the UE that is associated with the first SSB.

15. The apparatus of claim 13, wherein the instructions are further executable by the processor to cause the apparatus to:
receive, from the UE, a refinement request message requesting initiation of a beam refinement procedure; and
perform the beam refinement procedure using at least one of the first codebook, or the second codebook, or both, based at least in part on an estimated distance to the UE that is associated with the first SSB.

16. The apparatus of claim 15, wherein the instructions to perform the beam refinement procedure are further executable by the processor to cause the apparatus to:
perform the beam refinement procedure with the UE using the first codebook configured for beamforming at the first transmission distance range based at least in part on the first transmission distance range being greater than the second transmission distance range.

17. The apparatus of claim 13, wherein the instructions to transmit the control message are executable by the processor to cause the apparatus to:
transmit the control message indicating a first number of repetitions in the first set of SSBs and indicating a second number of repetitions in the second set of SSBs.

18. The apparatus of claim 17, wherein the first number of repetitions is smaller than the second number of repetitions based at least in part on the first transmission distance range being greater than the second transmission distance range.

19. The apparatus of claim 13, wherein the instructions are further executable by the processor to cause the apparatus to:
communicate a message to the UE using a first transmission beam of one of the first plurality of transmit beams or one of the second plurality of transmit beams based at least in part on the indication.

20. The apparatus of claim 13, wherein the instructions are further executable by the processor to cause the apparatus to:
transmit, to the UE, a message using a transmission beam of one of the first codebook or the second codebook via a subset of a plurality of antenna elements of an antenna panel based at least in part on an estimated distance to the UE that is associated with the first SSB.

21. The apparatus of claim 13, wherein:
the instructions to transmit the first set of SSBs are executable by the processor to cause the apparatus to transmit the first set of SSBs using a first quantity of transmission elements based at least in part on using the first codebook configured for beamforming at the first transmission distance range and the first transmission distance range being greater than the second transmission distance range; and the instructions to transmit the second set of SSBs are executable by the processor to cause the apparatus to transmit the second set of SSBs comprises transmitting the second set of SSBs using a second quantity of the transmission elements that is less than the first quantity of the transmission elements based at least in part on using the second codebook configured for beamforming at the second transmission distance range and the second transmission distance range being less than the first transmission distance range.

22. The apparatus of claim 13, wherein the instructions to receive the indication are executable by the processor to cause the apparatus to:

receive a measurement report comprising the indication of the first SSB.

23. The apparatus of claim 13, wherein a first quantity of the first plurality of transmit beams is greater than a second quantity of the second plurality of transmit beams based at least in part on the first transmission distance range being greater than the second transmission distance range.

24. The apparatus of claim 13, wherein:

each of the first plurality of transmit beams are associated with a first quantity of configurable beamwidths; and each of the second plurality of transmit beams are associated with a second quantity of configurable beamwidths that are each wider than the first quantity of configurable beamwidths based at least in part on the first transmission distance range being greater than the second transmission distance range.

25. The apparatus of claim 13, wherein the first set of SSBs are interspersed in a time domain with the second set of SSBs.

26. A method for wireless communication at a user equipment (UE), comprising:

receiving, from a network entity, a control message indicating a synchronization signal block (SSB) burst set;

receiving a first set of SSBs of the SSB burst set associated with a first plurality of transmit beams at the network entity, the first set of SSBs associated with a first codebook configured for beamforming at a first transmission distance range;

receiving a second set of SSBs of the SSB burst set associated with a second plurality of transmit beams at the network entity, the second set of SSBs associated with a second codebook configured for beamforming at a second transmission distance range; and transmitting, to the network entity and based at least in part on receiving the first set of SSBs and the second set of SSBs, an indication of a first SSB from the first set of SSBs or the second set of SSBs.

27. The method of claim 26, further comprising:

transmitting, to the network entity, a refinement request message requesting initiation of a beam refinement procedure; and receiving, from the network entity, a reply message declining to initiate the beam refinement procedure based at least in part on transmitting the refinement request message.

28. The method of claim 26, further comprising:

transmitting, to the network entity, a refinement request message requesting initiation of a beam refinement procedure; and performing the beam refinement procedure based at least in part on transmitting the refinement request message.

29. A method for wireless communication at a network entity, comprising:

transmitting a control message indicating a synchronization signal block (SSB) burst set;

transmitting, using a first codebook configured for beamforming at a first transmission distance range, a first set of SSBs of the SSB burst set via a first plurality of transmit beams;

transmitting, using a second codebook configured for beamforming at a second transmission distance range, a second set of SSBs of the SSB burst set via a second plurality of transmit beams; and receiving, from a user equipment (UE) and based at least in part on transmitting the first set of SSBs and the second set of SSBs, an indication of a first SSB from the first set of SSBs or the second set of SSBs.

30. The method of claim 29, further comprising:

receiving, from the UE, a refinement request message requesting initiation of a beam refinement procedure; and transmitting, to the UE, a reply message declining to initiate the beam refinement procedure based at least in part on an estimated distance to the UE that is associated with the first SSB.

* * * * *